(12) United States Patent
Takayama

(10) Patent No.: US 7,907,180 B2
(45) Date of Patent: Mar. 15, 2011

(54) SHOOTING SYSTEM, ACCESS CONTROL APPARATUS, MONITORING APPARATUS, CONTROL METHOD, AND STORAGE MEDIUM FOR PROCESSING AN IMAGE SHOT BY AN IMAGE SENSING APPARATUS TO RESTRICT DISPLAY

(75) Inventor: Hirosuke Takayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 700 days.

(21) Appl. No.: 11/848,482

(22) Filed: Aug. 31, 2007

(65) Prior Publication Data

US 2008/0055422 A1 Mar. 6, 2008

(30) Foreign Application Priority Data

Sep. 5, 2006 (JP) ................................ 2006-240791

(51) Int. Cl.
H04N 5/225 (2006.01)
H04N 5/232 (2006.01)

(52) U.S. Cl. ............................... 348/211.8; 348/207.11; 348/211.3; 348/159

(58) Field of Classification Search .............. 348/207.1, 348/207.11, 211.99, 211.3, 211.8, 211.11, 348/211.13
See application file for complete search history.

(56) References Cited

U.S. PATENT DOCUMENTS

| | | | | |
|---|---|---|---|---|
| 5,808,670 | A * | 9/1998 | Oyashiki et al. | 348/143 |
| 6,055,014 | A * | 4/2000 | Hosonuma et al. | 348/143 |
| 6,208,379 | B1 * | 3/2001 | Oya et al. | 348/211.11 |
| 6,240,455 | B1 | 5/2001 | Kamasaka et al. | 709/229 |
| 6,509,926 | B1 * | 1/2003 | Mills et al. | 348/143 |
| 6,529,234 | B2 | 3/2003 | Urisaka et al. | 348/213 |
| 6,744,461 | B1 * | 6/2004 | Wada et al. | 348/143 |
| 6,801,642 | B2 * | 10/2004 | Gorday et al. | 382/118 |
| 6,985,178 | B1 * | 1/2006 | Morita et al. | 348/211.3 |
| 7,079,177 | B2 * | 7/2006 | Okazaki et al. | 348/211.12 |
| 7,161,615 | B2 * | 1/2007 | Pretzer et al. | 348/143 |
| 7,218,342 | B2 * | 5/2007 | Kobayashi et al. | 348/211.8 |
| 7,289,563 | B2 | 10/2007 | Yamamoto et al. | 375/240.12 |
| 7,298,400 | B2 * | 11/2007 | Taguchi | 348/211.8 |
| 7,321,453 | B2 * | 1/2008 | Murata et al. | 358/479 |

(Continued)

FOREIGN PATENT DOCUMENTS

JP 10-161213 6/1998

(Continued)

Primary Examiner — John M Villecco
(74) Attorney, Agent, or Firm — Fitzpatrick, Cella, Harper & Scinto

(57) ABSTRACT

A shooting system which has an image sensing apparatus and a monitoring apparatus, distributes an image from the image sensing apparatus to the monitoring apparatus, and allows the monitoring apparatus to remote-control the image sensing apparatus, comprises: an unit adapted to set access permission information containing at least information on a user permitted to access, for each partial area contained in a shootable range of the image sensing apparatus; an unit adapted to set access restriction information with which the access-permitted user restricts access by other users to the access-permitted partial area; an unit adapted to generate an image having undergone an image process to restrict view of the partial area for the other access-restricted users; and an unit adapted to distribute the image having undergone the image process to the other access-restricted users.

20 Claims, 25 Drawing Sheets

U.S. PATENT DOCUMENTS

| | | | |
|---|---|---|---|
| 7,423,667 B2 * | 9/2008 | Hayasaka | 348/143 |
| 7,570,283 B2 * | 8/2009 | Sato et al. | 348/211.4 |
| 7,583,414 B2 * | 9/2009 | Kawai | 358/450 |
| 2003/0091239 A1 | 5/2003 | Imagawa et al. | 382/232 |
| 2004/0196370 A1 | 10/2004 | Yaegashi | 348/159 |
| 2004/0202382 A1 * | 10/2004 | Pilu | 382/276 |
| 2006/0242254 A1 * | 10/2006 | Okazaki et al. | 709/208 |
| 2007/0115356 A1 * | 5/2007 | Kang et al. | 348/143 |
| 2008/0158355 A1 * | 7/2008 | Jodan et al. | 348/143 |

FOREIGN PATENT DOCUMENTS

| | | |
|---|---|---|
| JP | 11-161672 | 6/1999 |
| JP | 2001-136514 | 5/2001 |
| JP | 2002-027425 | 1/2002 |
| JP | 2003-219383 | 7/2003 |
| JP | 2004-32459 | 1/2004 |
| JP | 2004-312267 | 11/2004 |
| JP | 2005-049939 | 2/2005 |
| JP | 2005-117163 | 4/2005 |

* cited by examiner

FIG. 15

| | 1501 | |
|---|---|---|
| | AREA I | |
| 1510 | X | X1 ~ X2 |
| 1511 | Y | Y1 ~ Y2 |
| 1512 | AREA ADMINISTRATOR | Admin |
| 1513 | ACCESS PERMISSION | Admin |
| | | NONE |
| | | NONE |
| 1514 | RESTRICTION CONTENTS | BLACKEN |
| 1515 | AUTHENTICATION INFORMATION | XXXXXX |

SET BY CAMERA ADMINISTRATOR (rows 1510–1513)

SET BY AREA ADMINISTRATOR (rows below 1513)

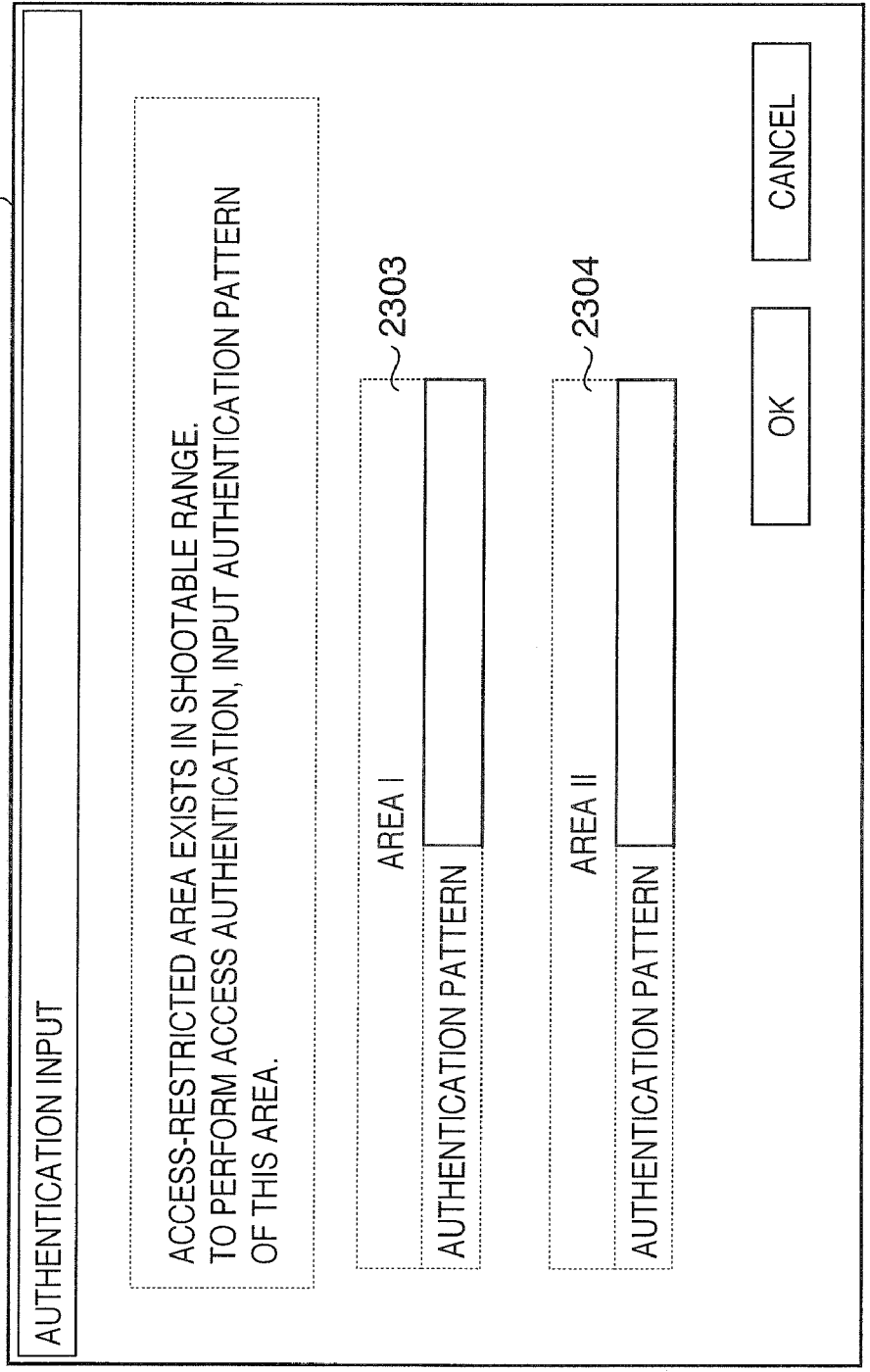

SHOOTING SYSTEM, ACCESS CONTROL APPARATUS, MONITORING APPARATUS, CONTROL METHOD, AND STORAGE MEDIUM FOR PROCESSING AN IMAGE SHOT BY AN IMAGE SENSING APPARATUS TO RESTRICT DISPLAY

BACKGROUND OF THE INVENTION

1. Field of the Invention

The present invention relates to a network camera system which distributes video images to a plurality of clients via a network.

2. Description of the Related Art

Recently, there have been proposed many network camera systems which distribute video shot by a digital video camera or the like via a network such as the Internet or a LAN so that a plurality of clients (computer terminals) can monitor it at remote places. Another known technique is a system which allows a client at a remote place not only to simply monitor video image but also to remote-control the pan/tilt angle and zoom ratio of the camera on the remote client side.

In a system capable of distributing remote-controllable video image to a plurality of clients, some ranges that specific clients should not see exist in the camera shootable range. For example, part of video from a camera installed outdoors may invade privacy and infringe the right of portrait.

To solve this problem, a person (to be referred to as a camera administrator hereinafter) who installs a camera controls the camera against specific clients so as to set a view restriction on the camera shootable range. By setting the view restriction, shooting of the view-restricted range is inhibited, the resolution of video within the view-restricted range is decreased, or video having undergone an image process such as mosaicking is distributed (see Japanese Patent Laid-Open Nos. 10-161213, 2001-136514, and 2002-027425).

A conventional system allows only a camera administrator to set a view restriction on the camera shootable range. However, a user whose area exists within the camera shootable range may exist among clients (to be referred to as users or area administrators hereinafter) who monitor video image. For example, when a camera is installed for monitoring in a public place such as a residential district, each user whose area exists within the camera shootable range may want to permit or inhibit shooting in consideration of privacy and security. It is desirable to give a user to be shot a privilege to set a restriction on the shootable range, instead of entrusting a camera administrator with setting of the view restriction.

When the camera administrator manages the view restriction in a conventional manner, it is cumbersome and difficult to distribute a video image which reflects all user requests.

SUMMARY OF THE INVENTION

It is an object of the present invention to implement a network camera system capable of distributing video which reflects a user's intention without increasing the load on a camera administrator.

According to the present invention, there is provided a shooting system which connects an image sensing apparatus to a monitoring apparatus capable of displaying an image shot by the image sensing apparatus so as to be able to communicate with each other, distributes an image from the image sensing apparatus to the monitoring apparatus, and allows the monitoring apparatus to remote-control the image sensing apparatus, comprising: an access permission setting unit adapted to set access permission information containing at least information on a user permitted to access, for each partial area contained in a shootable range of the image sensing apparatus; an access restriction setting unit adapted to set access restriction information with which the access-permitted user restricts access by other users to the access-permitted partial area; an image processing unit adapted to generate an image having undergone an image process to restrict view of the partial area for the other access-restricted users; and an image distribution unit adapted to distribute the image having undergone the image process to the other access-restricted users.

According to the present invention, there is provided an image sensing apparatus which can be remote-controlled by a monitoring apparatus and distributes an image to the monitoring apparatus, comprising: an access permission setting unit adapted to set access permission information containing at least information on a user permitted to access, for each partial area contained in a shootable range of the image sensing apparatus; an image processing unit adapted to generate an image having undergone an image process to restrict view of the partial area for other access-restricted users on the basis of access restriction information set for the partial area the access-permitted user is permitted to access; and an image distribution unit adapted to distribute the image having undergone the image process to the other access-restricted users.

According to the present invention, there is provided a monitoring apparatus which displays an image distributed from an image sensing apparatus and can remote-control the image sensing apparatus, comprising: an access restriction setting unit adapted to set access restriction information with which a user, who is permitted by the monitoring apparatus to access a partial area contained in a shootable range of the image sensing apparatus, restricts access by other users to the access-permitted partial area; a transmission unit adapted to transmit the access restriction information to the image sensing apparatus; and a reception unit adapted to receive, from the image sensing apparatus, an image for which the image sensing apparatus performs an image process to restrict view of the partial area for the other access-restricted users.

According to the present invention, there is provided a control method of a shooting system which connects an image sensing apparatus to a monitoring apparatus capable of displaying an image shot by the image sensing apparatus so as to be able to communicate with each other, distributes an image from the image sensing apparatus to the monitoring apparatus, and allows the monitoring apparatus to remote-control the image sensing apparatus, comprising the steps of: setting access permission information containing at least information on a user permitted to access, for each partial area contained in a shootable range of the image sensing apparatus; setting access restriction information with which the access-permitted user restricts access by other users to the access-permitted partial area; generating an image having undergone an image process to restrict view of the partial area for the other access-restricted users; and distributing the image having undergone the image process to the other access-restricted users.

According to the present invention, there is provided a control method of an image sensing apparatus which can be remote-controlled by a monitoring apparatus and distributes an image to the monitoring apparatus, comprising the steps of: setting access permission information containing at least information on a user permitted to access, for each partial area contained in a shootable range of the image sensing apparatus; generating an image having undergone an image process to restrict view of the partial area for other access-restricted users on the basis of access restriction information set for the partial area the access-permitted user is permitted to access; and distributing the image having undergone the image process to the other access-restricted users.

According to the present invention, there is provided a control method of a monitoring apparatus which displays an image distributed from an image sensing apparatus and can remote-control the image sensing apparatus, comprising the steps of: setting access restriction information with which a user, who is permitted by the monitoring apparatus to access a partial area contained in a shootable range of the image sensing apparatus, restricts access by other users to the access-permitted partial area; transmitting the access restriction information to the image sensing apparatus; and receiving, from the image sensing apparatus, an image for which the image sensing apparatus performs an image process to restrict view of the partial area for the other access-restricted users.

Since the camera administrator does not set any view restriction on the camera shootable range, the work load on the camera administrator can be reduced.

Since each user serving as an area administrator has a restriction setting privilege and can set a desired view restriction, an invasion of privacy can be avoided.

Further features of the present invention will become apparent from the following description of exemplary embodiments with reference to the attached drawings.

BRIEF DESCRIPTION OF THE DRAWINGS

FIG. 15 is a table illustrating the structure of an area management database according to the third embodiment;

FIGS. 23A and 23B are views illustrating authentication input windows automatically and simultaneously displayed when a view-restricted area exists in the camera shootable range.

DESCRIPTION OF THE EMBODIMENTS

Preferred embodiments of the present invention will be described in detail below with reference to the accompanying drawings.

The following embodiments are merely examples of practicing the present invention, and should be properly modified and changed depending on the arrangements and various conditions of apparatuses to which the present invention is applied. The present invention is not limited to the following embodiments.

First Embodiment

In the first embodiment, the shootable range of a network camera contains area I belonging to user A and area II belonging to user B. User A, user B, and user C, whose area does not exist in the shootable range, use their viewers to monitor video of the network camera which shoots areas I and II.

User information including the name, address, and IP address is registered in the network camera when each user, at least whose area is to be shot, accesses (connects to) the camera in advance.

Figure 1:
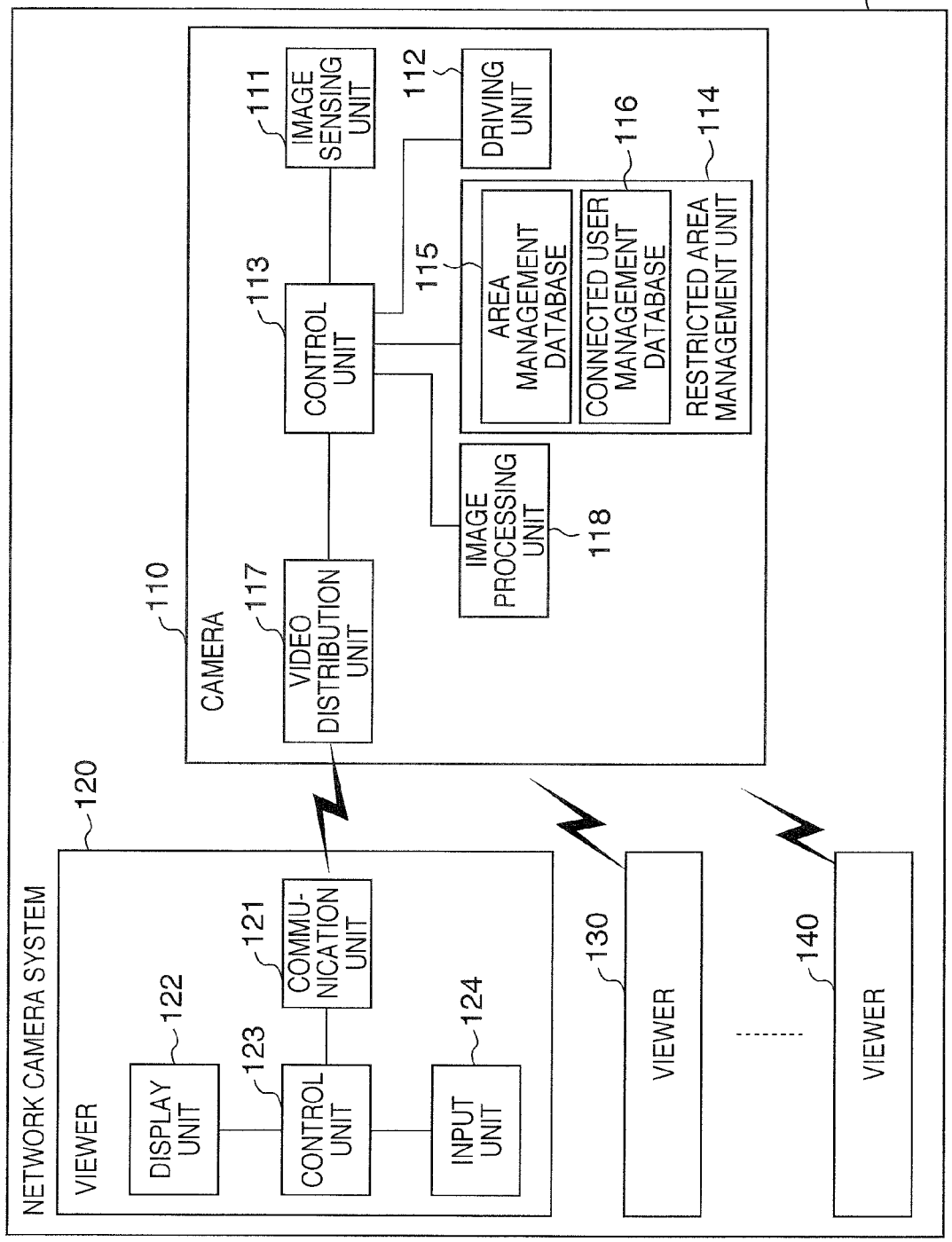
FIG. 1 is a block diagram showing the configuration of a network camera system according to the first embodiment of the present invention.

FIG. 1 is a block diagram showing the configuration of a network camera system according to the first embodiment of the present invention.

A network camera system 100 comprises a network camera (to be referred to as a camera hereinafter) 110, and viewers 120, 130, and 140.

The camera 110 comprises an image sensing unit 111, driving unit 112, control unit 113, restricted area management unit 114, distribution unit 117, and image processing unit 118.

The driving unit 112 controlled by the control unit 113 changes the direction of the image sensing unit 111. The image sensing unit 111 shoots video in the direction to which the driving unit 112 has driven it.

The restricted area management unit 114 is made up of an area management database 115 and connected user management database 116. The area management database 115 stores access restriction information set by a user having a restriction setting privilege (to be described later) for a view-restricted area assigned to each user. The connected user management database 116 stores access permission information generated for each view-restricted area for each user when he accesses the camera 110.

The image processing unit 118 generates video of a predetermined pattern by performing a predetermined image process for original video transmitted from the image sensing unit 111 based on access permission information stored in the connected user management database 116, in order to distribute the video to each user.

The distribution unit 117 distributes video of a pattern generated by the image processing unit 118 to the viewers 120, 130, and 140 of users in accordance with access permission information of each user who accesses the camera 110.

Each of the viewers 120, 130, and 140 comprises a communication unit 121, display unit 122, control unit 123, and input unit 124.

Video distributed from the camera 110 is received by the communication unit 121 and displayed on the display unit 122. The camera 110 receives, via the communication unit 121, a request input from the input unit 124 to control the camera 110, or access restriction information concerning a view-restricted area for which a user has the restriction setting privilege.

Figure 2:
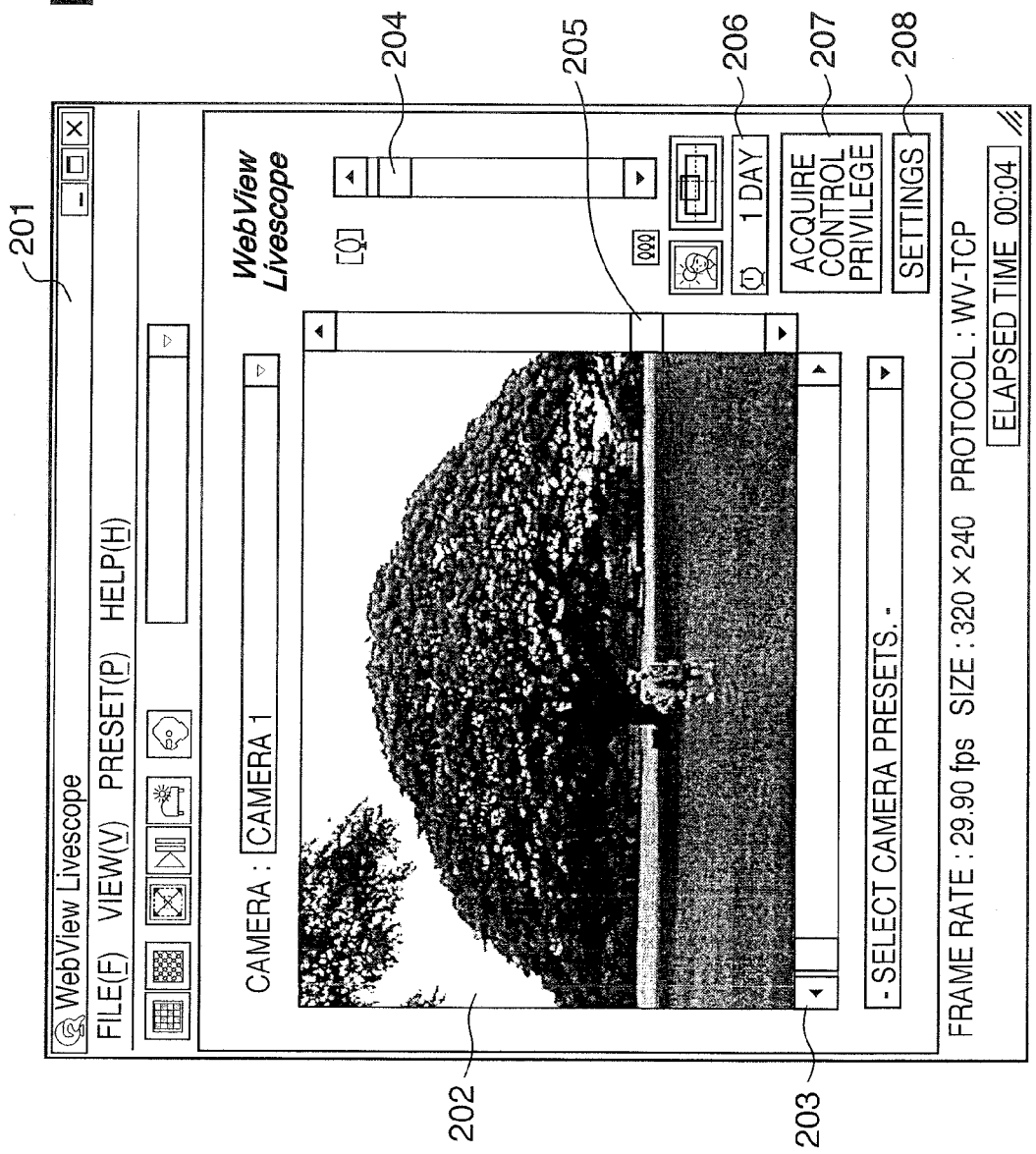
FIG. 2 is a view illustrating a user interface window on a viewer.

FIG. 2 illustrates a user interface (UI) window on the viewer.

In FIG. 2, a viewer 201 has a shot image display area 202 for displaying video of the camera 110 designated from the input unit 124. The viewer 201 also has a pan (lateral direction) scroll bar 203, zoom slider 204, and tilt (longitudinal direction) scroll bar 205 for remote-controlling the shooting conditions and shooting orientation of the camera 110.

The viewer 201 also has a remaining control privilege possession time display 206, control privilege acquisition button 207, and setting button 208. By pressing the control privilege acquisition button 207, the user can request acquisition of the privilege to control the camera 110. When the user acquires the control privilege, he can control the shooting direction and zoom of the camera 110 by operating the pan scroll bar 203, zoom slider 204, and tilt scroll bar 205. The setting button 208 will be described later.

Procedures to give users A and B, by a camera administrator, a privilege (to be referred to as a restriction setting privilege hereinafter) to set view restrictions on areas I and II will be explained with reference to the flowchart of FIG. 3.

Figure 3:
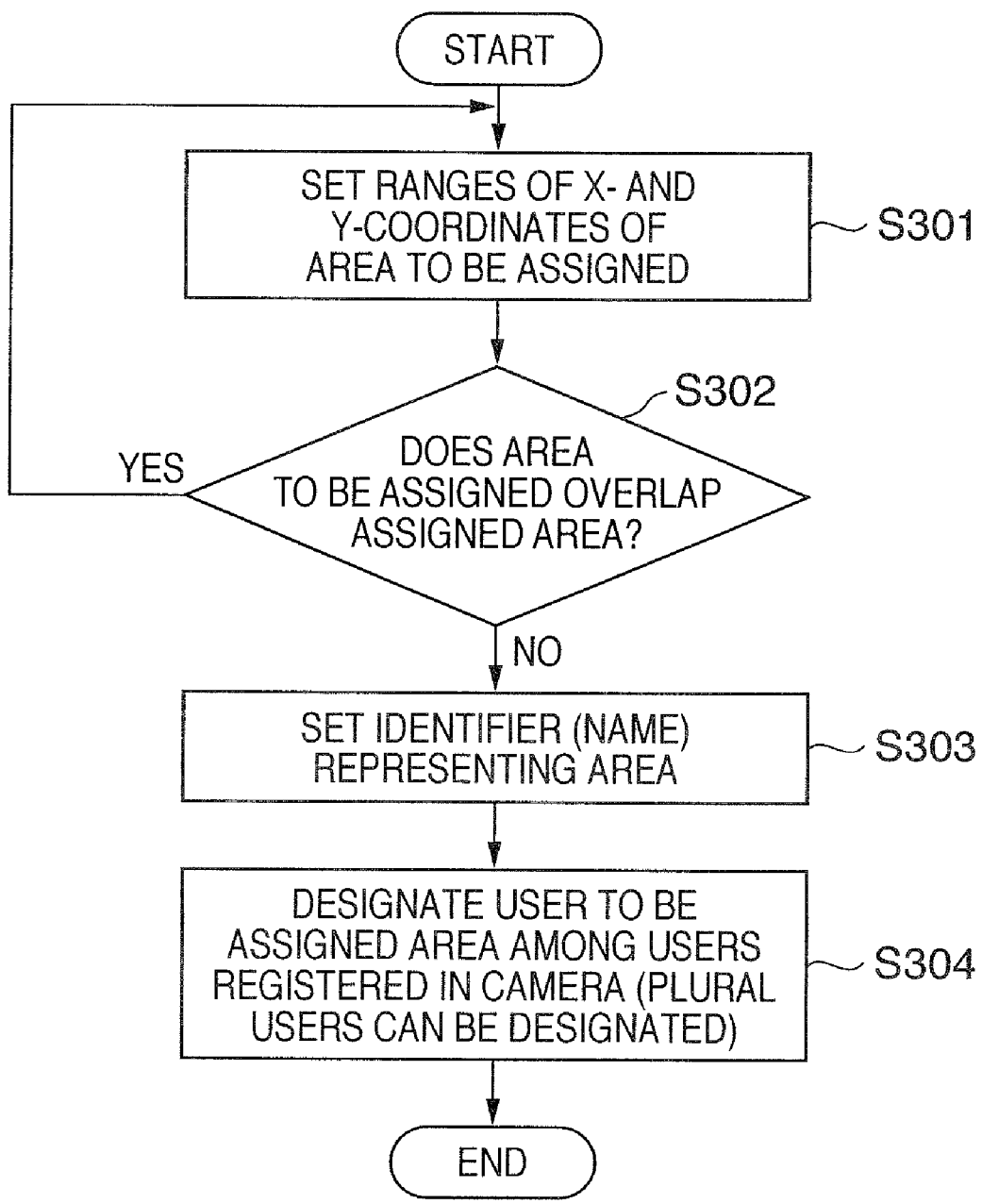
FIG. 3 is a flowchart showing procedures to assign a view-restricted area to a user by a camera administrator.
Figure 4:
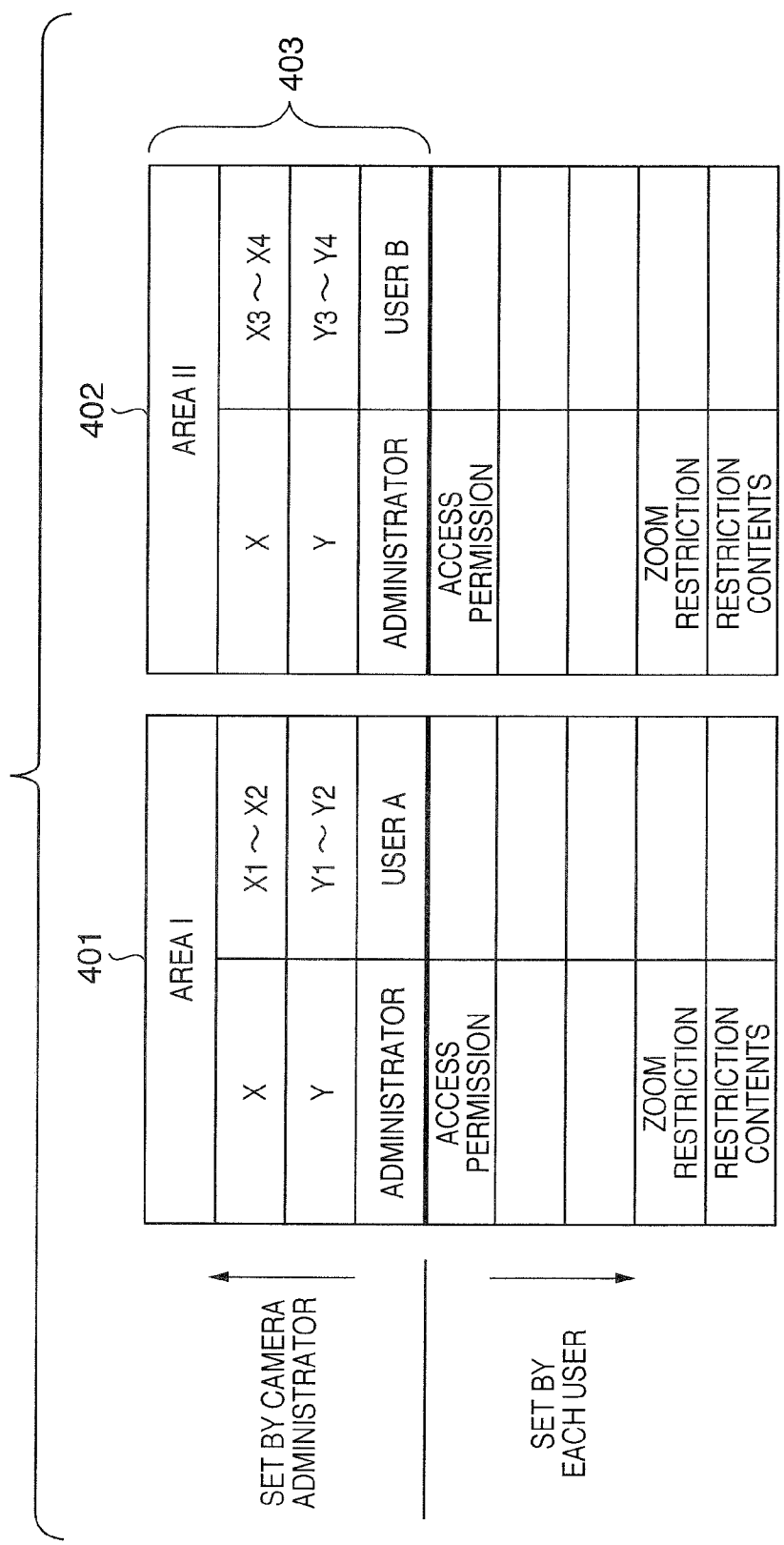
FIG. 4 is a view showing the header field of an area management database.

In FIG. 3, when giving users A and B the restriction setting privilege to areas I and II contained in the shootable range of the camera 110, the camera administrator sets tables 401 and 402 shown in FIG. 4 in the area management database 115 for areas I and II, respectively.

More specifically, the ranges of areas I and II (S301), and identifiers representing the respective areas (S303), and information on users to be given the restriction setting privilege to the respective areas (S304) are set in headers 403 of the tables 401 and 402 in the area management database 115. The number of users to be given the restriction setting privilege for one area is not limited to one, and a plurality of users can be given the privilege.

In S301, the area range is defined by setting the maximum and minimum values of X- and Y-coordinates. If the range to be set overlaps a range which has already been set (YES in S302), the range is set again to prevent overlapping of set ranges.

By these procedures, the camera administrator gives a predetermined user the restriction setting privilege for a predetermined view-restricted area. When the user accesses the camera 110 next time, his viewer user displays a notification that he has the restriction setting privilege to the predetermined view-restricted area.

Figure 5:
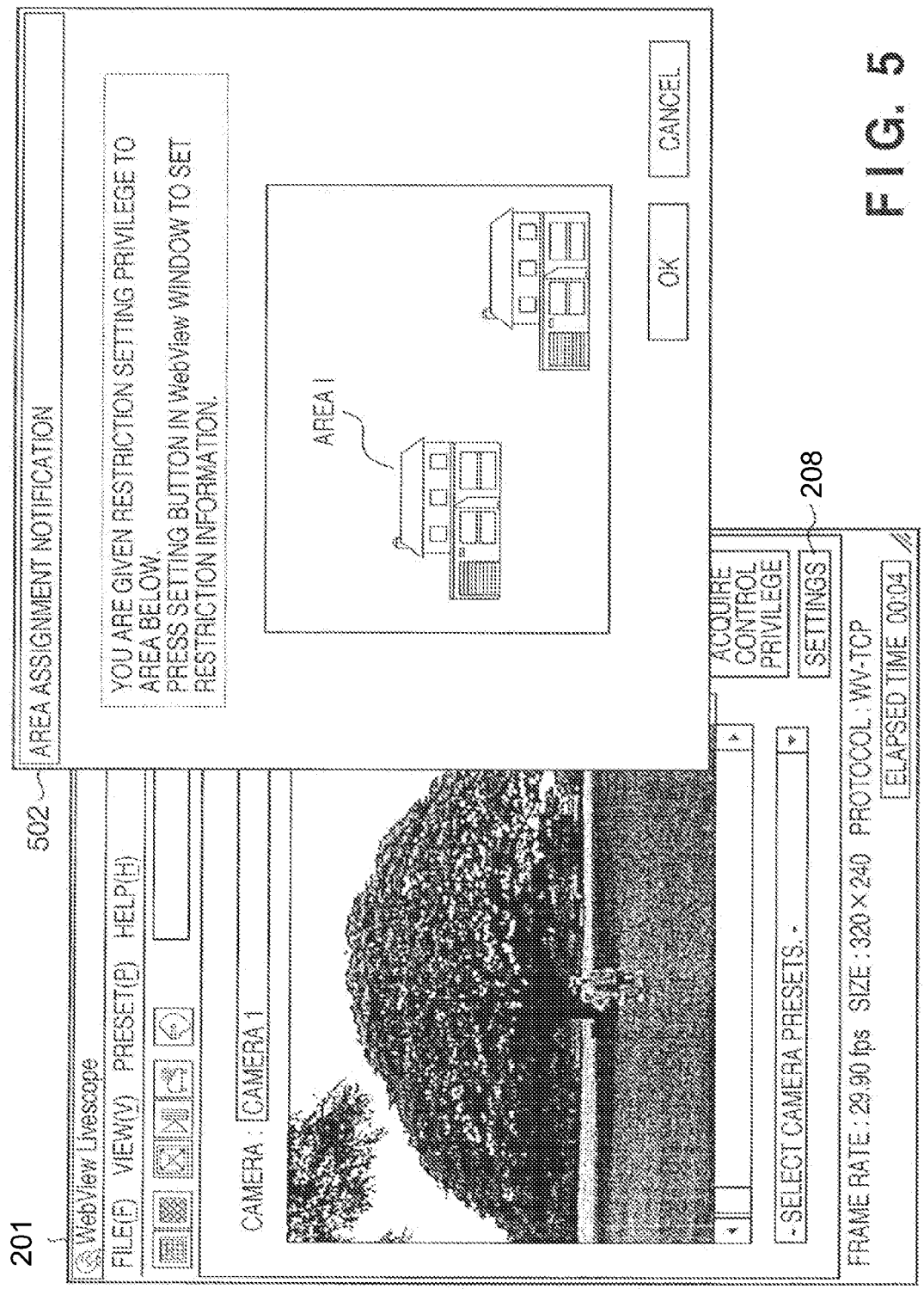
FIG. 5 is a view illustrating a window displayed when a user having a restriction setting privilege accesses a camera.

FIG. 5 illustrates a window displayed when user A having the restriction setting privilege for area I accesses the camera 110.

In FIG. 5, an area assignment notification window 502 shows an image representing an area for which user A has the restriction setting privilege. The user can easily confirm a view-restricted area for which he has the restriction setting privilege.

Procedures to set access restriction information by users A and B for view-restricted areas for which they are given the restriction setting privilege by the process of FIG. 3 will be explained with reference to the flowchart of FIG. 6.

Figure 6:
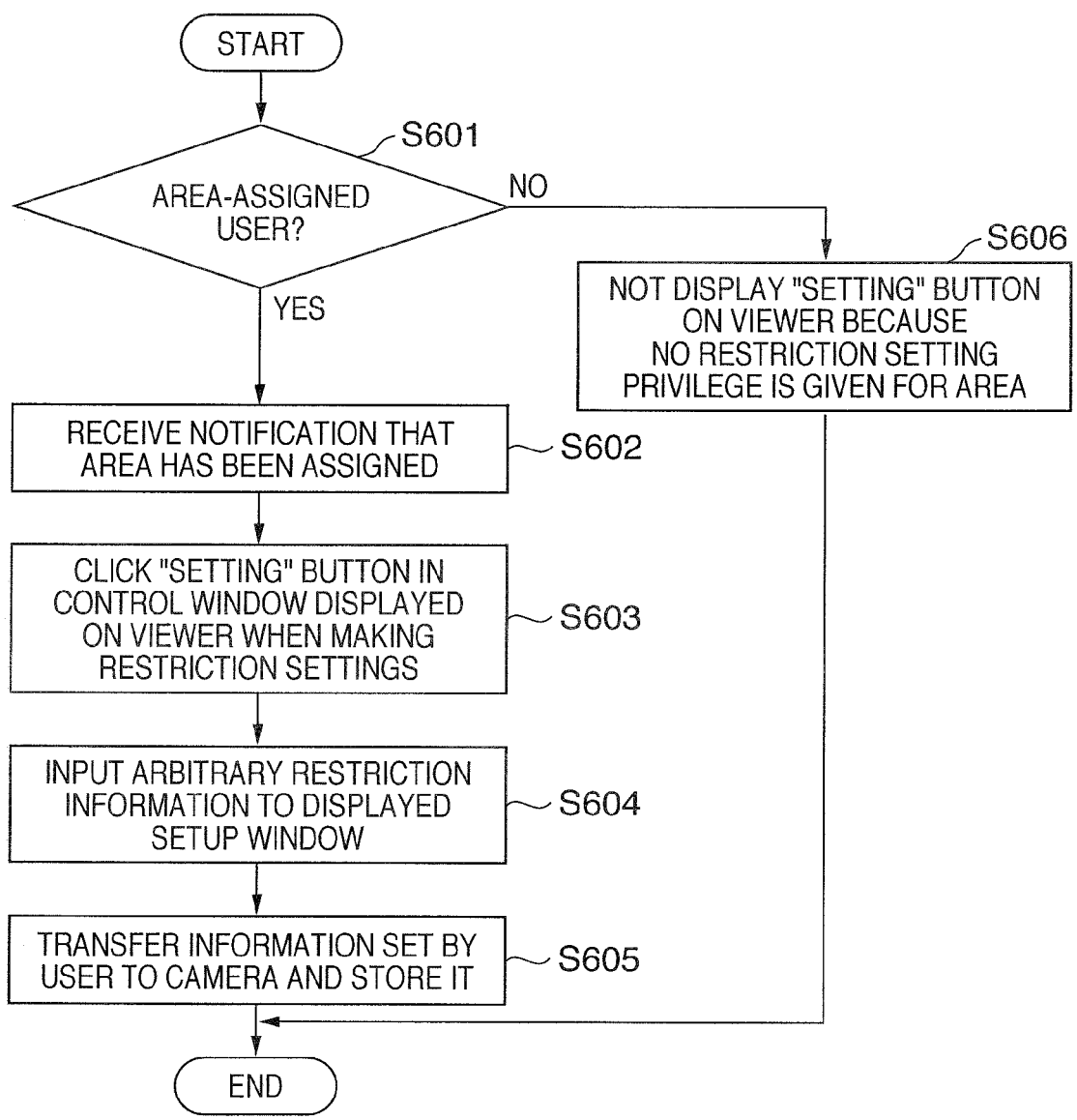
FIG. 6 is a flowchart showing procedures to set a restriction on a view-restricted area by a user.

In FIG. 6, if a predetermined user is notified that he is given the restriction setting privilege (S601 and S602), he can set various kinds of access restriction information for the view-restricted area. The user clicks a setting button 208 displayed on a viewer window 201 (S603). Then, a setup window 701 as shown in FIG. 7 appears to allow the user to make arbitrary settings and modifications to the access restriction information (S604).

Figure 7:
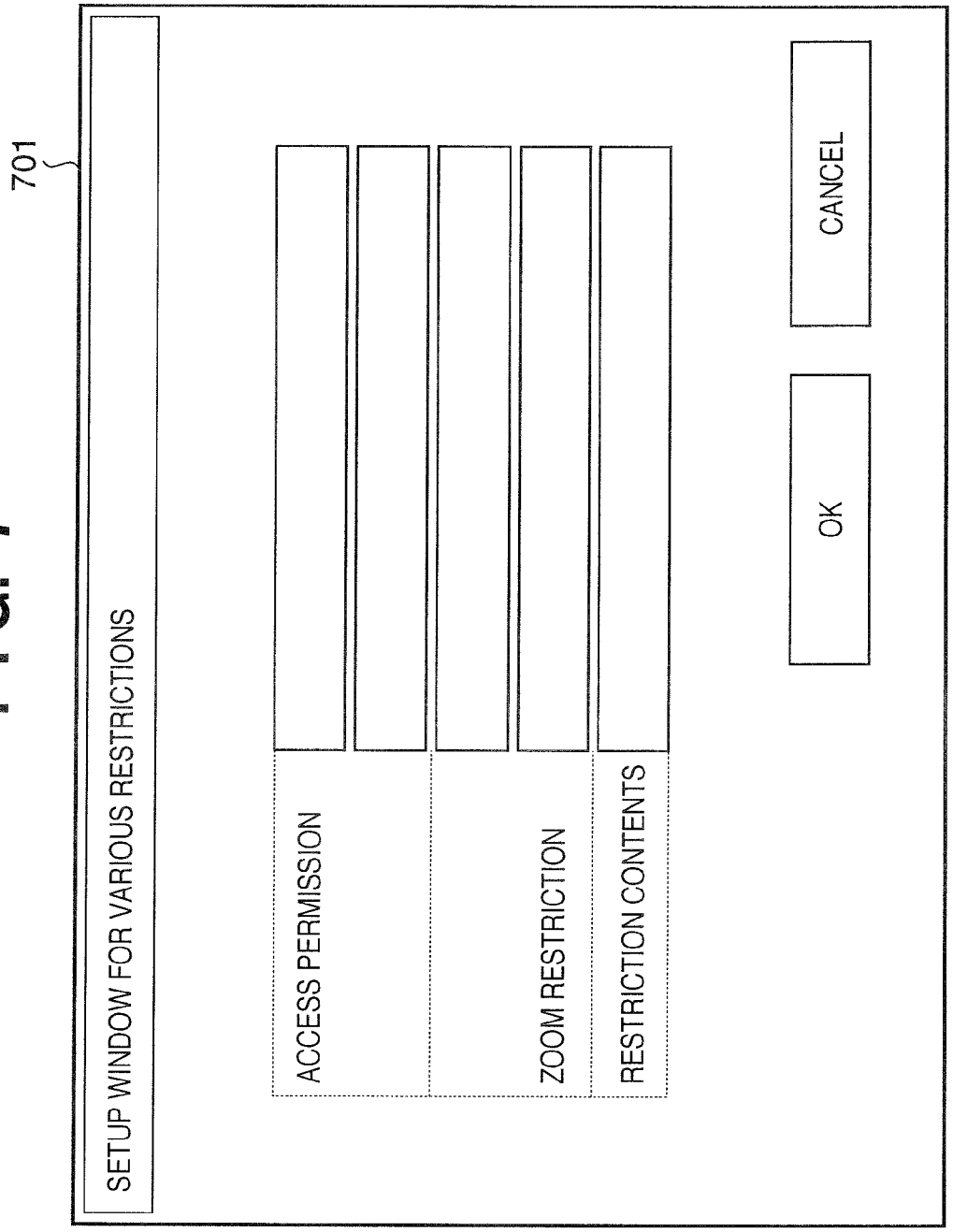
FIG. 7 is a view illustrating a restriction setup window.

In FIG. 7, a user permitted to access a predetermined view-restricted area, a zoom restriction for setting a zoom at which a restriction is imposed on the predetermined view-restricted area, and the restriction contents can be set. When a user has the restriction setting privilege for a plurality of view-restricted areas, he can make settings for each view-restricted area by clicking the setting button 503 shown in FIG. 5 and designating a target view-restricted area. When resetting a view-restricted area for which the user has already set access restriction information, he can make settings again such as addition or modification by clicking the setting button 503 to display the registered access restriction information in the setup window 701.

The setup window 701 can be displayed by clicking the setting button 503 only when a user having the restriction setting privilege accesses the camera 110 (S601). In other words, the viewer window 201 does not display the setting button 208 when a user having no restriction setting privilege accesses the camera 110 (S606).

When a predetermined user sets various kinds of access restriction information in the setup window 701 shown in FIG. 7, the set pieces of information are transmitted to the camera 110 via the communication unit 121. The camera 110 stores the received pieces of access restriction information in restriction information management areas 804 following headers 803 of tables 801 and 802 in FIG. 8 set in the area management database 115 for respective view-restricted areas (S605).

Figure 8:
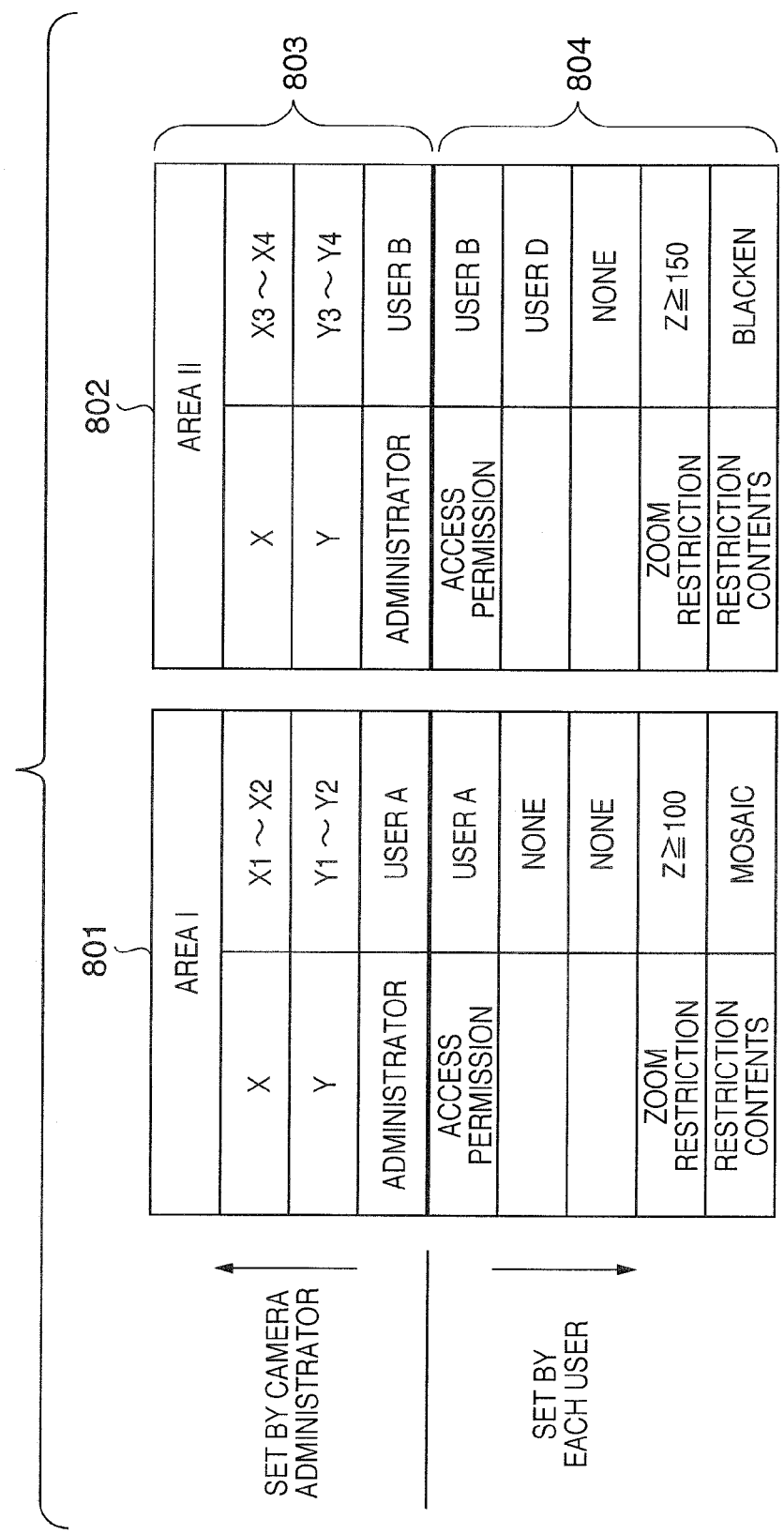
FIG. 8 is a table showing the overall structure of the area management database.

FIG. 8 illustrates the structure of the area management database 115 when users A and B set access restriction information for respective view-restricted areas.

In the table 801 of FIG. 8, user A sets a process to mosaic the view-restricted area for all users except for him when the zoom value reaches 100 or more.

In the table 802, user B gives user D in addition to user B the privilege to monitor the view-restricted area, and sets a process to blacken the view-restricted area for users except for users B and D when the zoom value reaches 150 or more.

In this way, each user serving as an area administrator can set desired access restriction information for a view-restricted area assigned to him by the camera administrator.

Procedures to distribute video complying with access permission information to the view-restricted area of each user when users A, B, and C access the camera 110, while users A and B set access restriction information for areas I and II, will be explained.

When many unspecified users access the camera 110 while access restriction information is set for a predetermined view-restricted area, an access permission information table representing the presence/absence of access permission for each user is generated in the connected user management database 116. The access permission information is set for each view-restricted area and each user based on information stored in the area management database 115.

Figure 9:
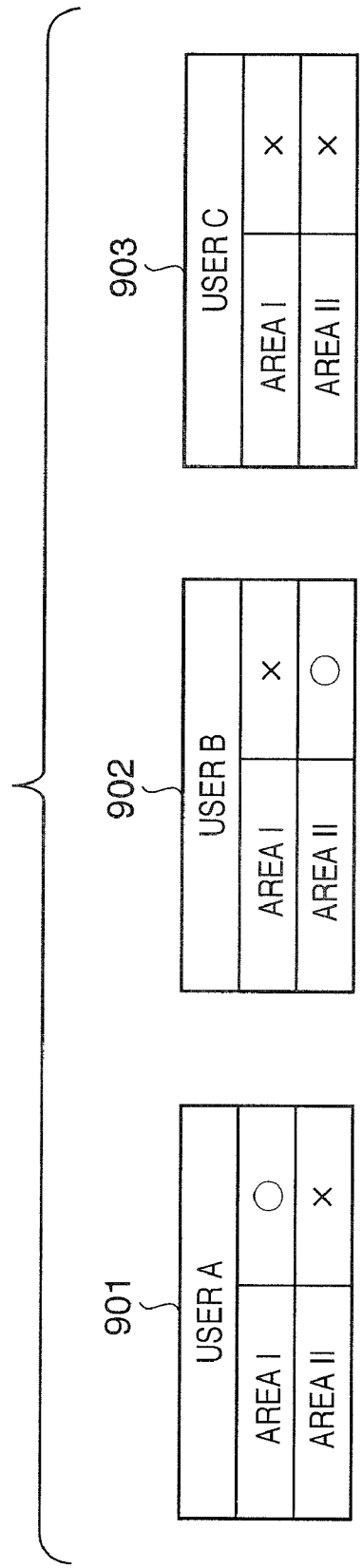
FIG. 9 is a table showing access permission information generated for each user in a connected user management database.

FIG. 9 illustrates access permission information tables 901, 902, and 903 generated for respective users A, B, and C when the zoom value is 150 or more.

In FIG. 9, as for user A, information (○) representing that he is permitted to access area I, and information (○) representing that he is not permitted to access area II.

As for user B, information (X) representing that he is not permitted to access area I, and information (○) representing that he is permitted to access area II, or information representing that he is permitted to access only area II is stored.

As for user C, information (X) representing that he is permitted to access neither area I nor II is stored.

Figure 13:
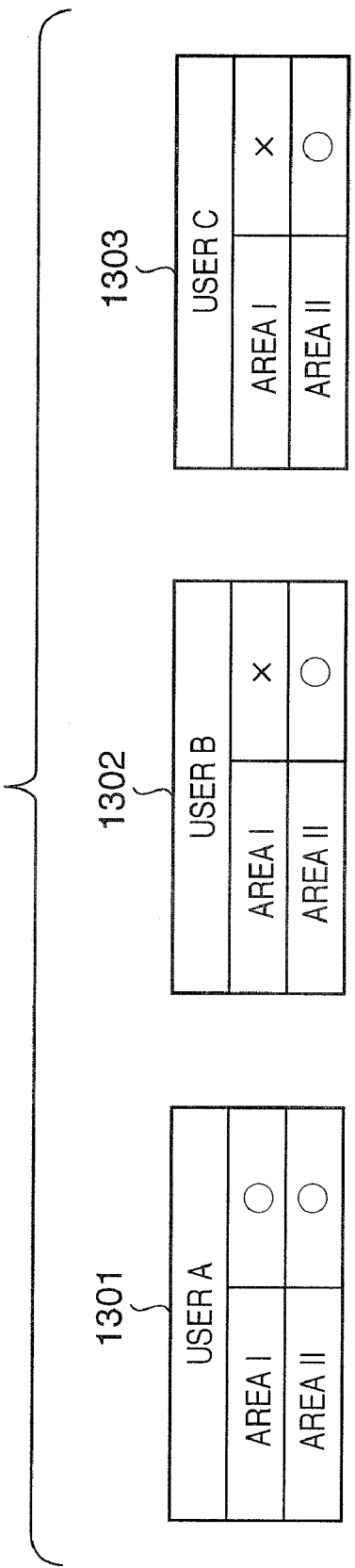
FIG. 13 is a table showing access permission information generated for each user in a connected user management database according to the second embodiment.

The tables 901 to 903 generated in the connected user management database 116 dynamically change in accordance with the zoom value in shooting. For example, when the zoom value becomes 100 (inclusive) to 150 (exclusive), tables 1301, 1302, and 1303 shown in FIG. 13 for users A, B, and C store access permission information as shown in FIG. 13.

In a default state in which a user having the restriction setting privilege does not set any access restriction information, the camera administrator can make in advance a setting of giving access permission to only a user having the restriction setting privilege, or giving access permission to all users.

Figure 10:
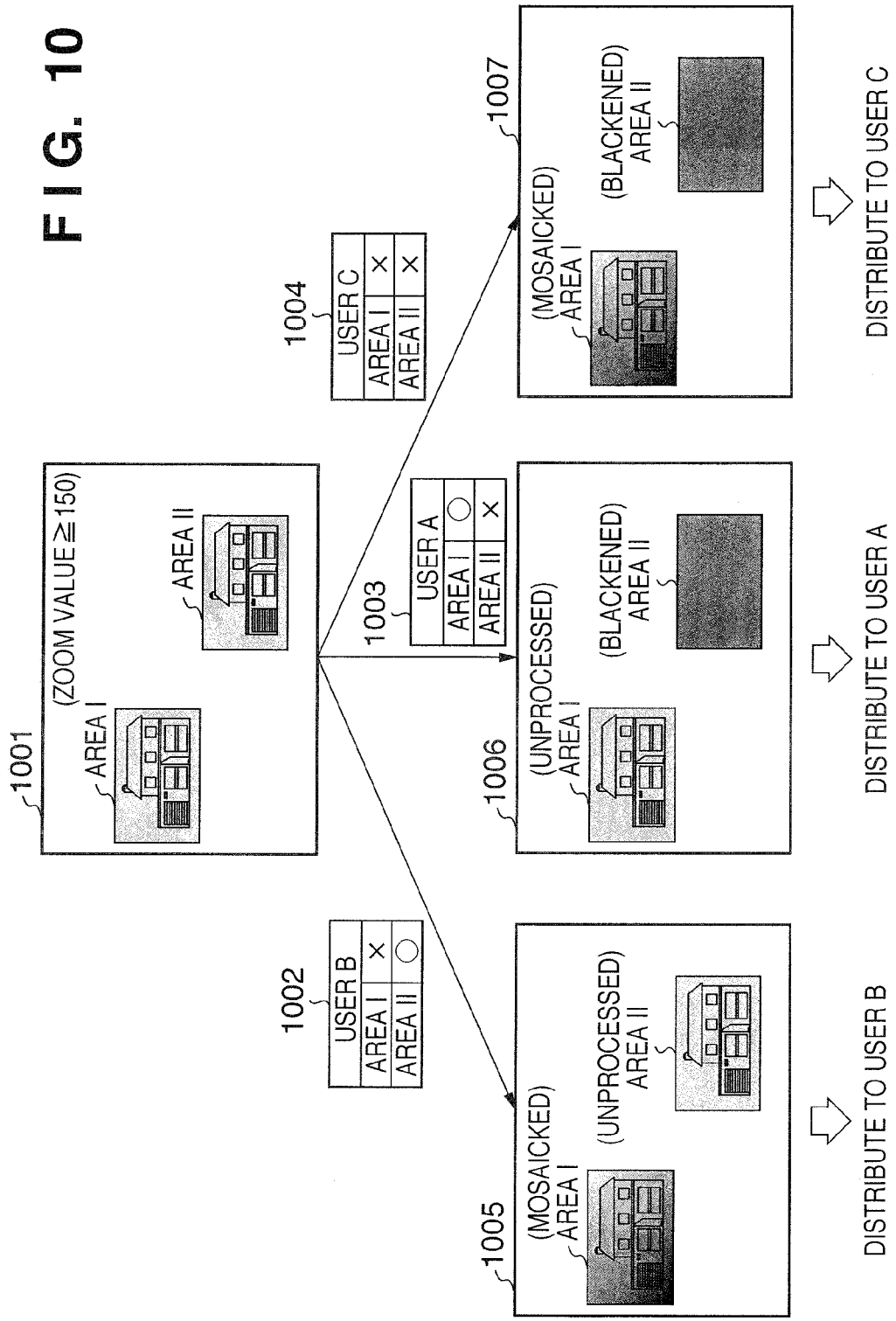
FIG. 10 is a view for explaining an image process and distribution process based on access permission information.

An image process by the image processing unit 118 on the basis of access restriction information will be described with reference to FIG. 10.

Based on pieces of information stored in the two databases 115 and 116 of the restricted area management unit 114, the image processing unit 118 generates video of a predetermined pattern by performing an image process for original video output from the image sensing unit 111. For example, when the zoom value is 150 or more and areas I and II are shot simultaneously, three video images are generated from original video 1001 in accordance with pieces of access permission information 1002, 1003, and 1004 for respective users. More specifically, as shown in FIG. 10, pattern 1 video 1005 is generated by mosaicking area I. Pattern 2 video 1006 is generated by blackening area II. Pattern 3 video 1007 is generated by mosaicking area I and blackening area II.

These three pattern video images generated by the image processing unit 118 are sent to the distribution unit 117. The pattern 1 video 1005 is distributed to user B, the pattern 2 video 1006 is distributed to user A, and the pattern 3 video 1007 is distributed to user C.

The image process and distribution process are executed in real time in accordance with a user who accesses the camera 110, and the shooting conditions and shooting orientation of original video actually shot by the camera 110.

As described above, the network camera system can distribute preferable video image complying with access restriction information set for each user in accordance with a view-restricted area assigned to a user.

Second Embodiment

A case where the restriction setting privilege is given to a plurality of users for one area will be described with reference to FIGS. 11 and 12.

In the second embodiment, area III belonging to two users E and F exists in the shootable range of a camera 110.

Figure 11:
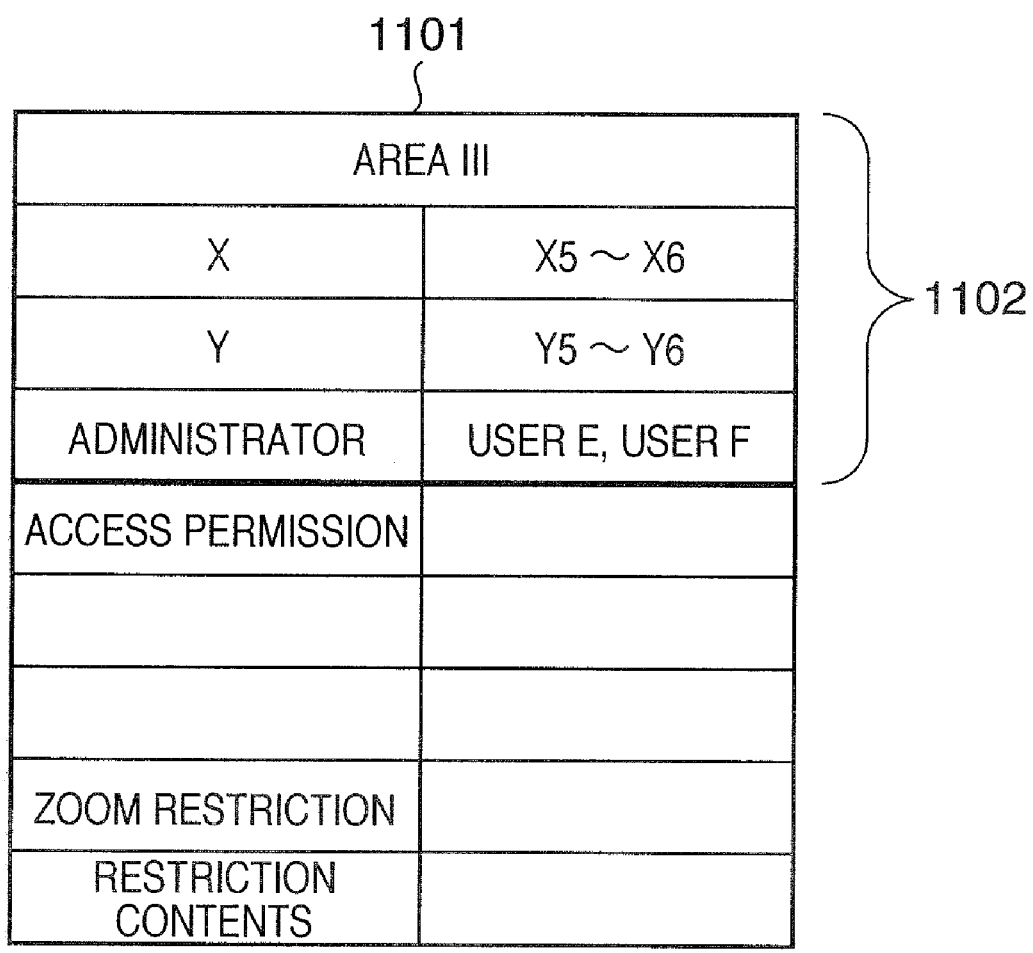
FIG. 11 is a view showing the header field of an area management database according to the second embodiment.

In this case, the camera administrator creates an area III table 1101 in an area management database 115, as shown in FIG. 11, and stores users E and F as co-administrators in the administrator column of a header 1102.

When users E and F having the restriction setting privilege for area III access the camera 110 next time, their viewers display a notification that they have the restriction setting privilege for area III.

Figure 12:
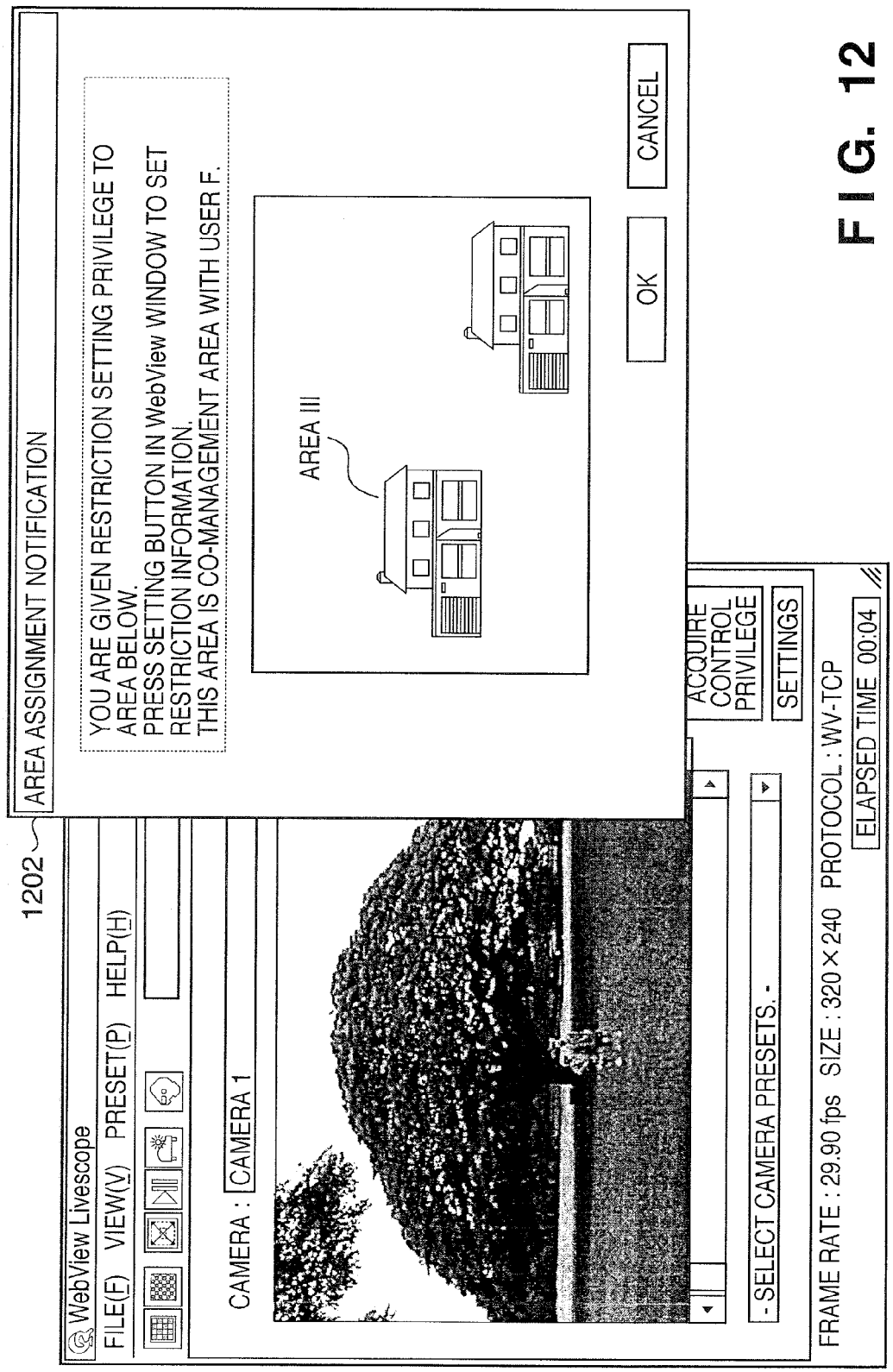
FIG. 12 is a view illustrating a window displayed when a user having a restriction setting privilege accesses a camera according to the second embodiment.

FIG. 12 illustrates a notification window displayed on the viewer of user E. An area assignment notification window 1202 displays a notification that area III is a co-management area with another user.

When a plurality of users manage one area jointly, the setting columns of various kinds of access restriction information for area III in the area management database 115 are shared, and each user can set and modify information stored in the database. When a co-administrator changes restriction settings to the target area, another co-administrator is notified by a message to this effect.

In this fashion, the present invention can be easily applied to even a case where the restriction setting privilege is given to a plurality of users for one area.

The present invention is not limited to the above-described embodiments. For example, the camera 110 may notify a user by using a communication tool such as e-mail, in place of displaying a notification when a user having the restriction setting privilege accesses the camera 110 as described in the embodiments.

Third Embodiment

In the first embodiment, a predetermined user is given the restriction setting privilege for a view-restricted area, and not the camera administrator but the predetermined user sets access restriction information to the area. In this case, a user (area administrator) who sets access restriction information sets in advance a user permitted to access a view-restricted area, and only the access-permitted user can monitor this area. In other words, when a user not permitted to access in advance monitors video image, he can always see only view-restricted video.

However, it is convenient if a user not permitted to access in advance can monitor a view-restricted area by removing the access restriction later. For example, when a given house is set in the view-restricted area and only a resident of the housing is access-permitted in advance, a relative, good friend, or the like may want to monitor the house through video image.

In this case, according to the first embodiment, a user who monitors video image must contact the area administrator, and the area administrator must register the user to permit access. This takes a long time until monitoring is permitted. When there are many users to be permitted to access in reregistration, the area administrator must register all the users, putting heavy work on the area administrator.

To solve this problem, the third embodiment enables removing the access restriction later for a user authenticated by the area administrator even if the user is not access-permitted in advance.

In the third embodiment, view-restricted area I exists in the shootable range of a camera 110, and users A and B use their viewers to monitor video of the camera 110 shooting this area. Assume that the camera administrator permits neither user A nor user B to access area I.

Figure 14:
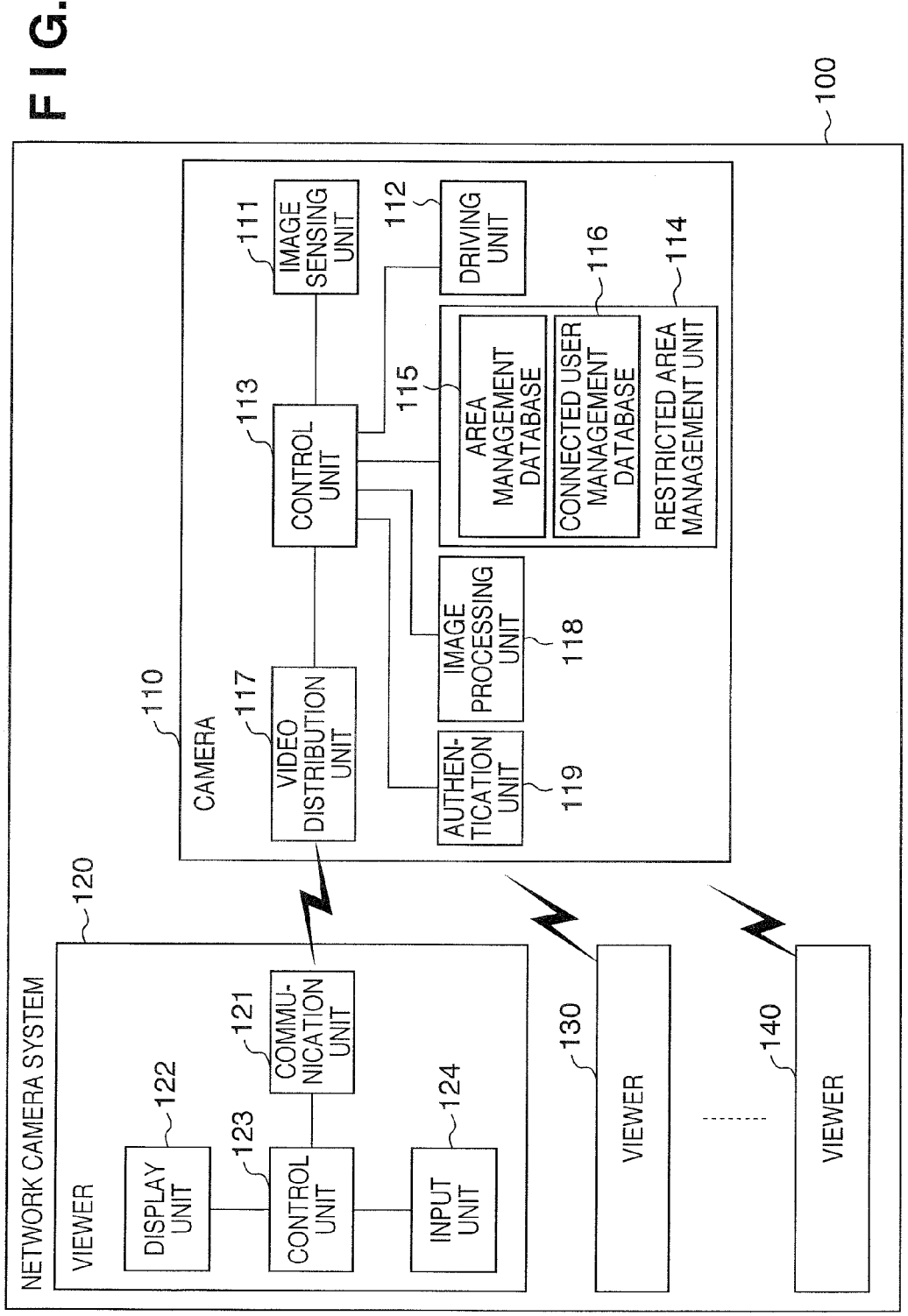
FIG. 14 is a block diagram showing the configuration of a network camera system according to the third embodiment.

FIG. 14 is a block diagram showing the configuration of a network camera system according to the third embodiment. The same reference numerals as those in FIG. 1 denote the same parts.

The third embodiment is different from the first embodiment in the presence of an authentication unit 119.

The authentication unit 119 compares authentication information set in an area management database 115 with an authentication pattern input for a view-restricted area by a user who accesses the camera 110 and monitors video image.

An image processing unit 118 generates video of a predetermined pattern to be distributed by performing a predetermined image process for original video transmitted from an image sensing unit 111 based on pieces of information in two databases 115 and 116 in a restricted area management unit 114 and the authentication result of the authentication unit 119.

Video transmitted from the camera 110 is received by a communication unit 121 and displayed on a display unit 122. The camera 110 receives, via the communication unit 121, a request input from an input unit 124 to control the camera 110, or the authentication pattern of a view-restricted area.

The remaining arrangement is the same as that in FIG. 1, and a description thereof will not be repeated.

A UI window on the viewer according to the third embodiment is also the same as that in FIG. 2, and a description thereof will not be repeated.

Procedures to distribute video having undergone a predetermined image process to each user accessing the camera 110 in accordance with restriction contents set for a view-restricted area within the shootable range will be explained.

FIG. 15 illustrates the structure of the area management database according to the third embodiment.

According to the third embodiment, view-restricted area I (for which access restriction information is set) exists in the shootable range of the camera 110. Thus, a table 1501 for storing access restriction information of area I is created in the area management database 115. When a plurality of view-restricted areas exist in the shootable range, tables identical to the table 1501 are created for the respective view-restricted areas.

The table 1501 stores an identifier 1510 representing a view-restricted area, a range 1511 of each view-restricted area, and area administrator information 1512 of each view-restricted area. The table 1501 further stores information 1513 on a user permitted to access a view-restricted area, restriction contents 1514 with which access is permitted, and authentication information 1515 for removing the view restriction. The camera administrator sets the pieces of information 1510 to 1512 when assigning a view-restricted area to each user. An area administrator access-permitted by the camera administrator sets the pieces of information 1513 to 1515. The range of a view-restricted area is defined by setting the maximum and minimum values of X- and Y-coordinates, similar to the first embodiment.

In FIG. 15, the area administrator of area I is the same as the camera administrator. Access permission is given to only the camera administrator, and when other users access the camera 110, video in which a view-restricted area is blackened is distributed. If the area administrator does not want to remove the access restriction based on authentication information, it suffices not to make any arbitrary setting in the setting column of the authentication information 1515.

How to impose various view restrictions in the present invention is not limited to the above-described embodiments. It is also possible to set, for example, a lower limit zoom ratio at which the view restriction is imposed, and to restrict monitoring of video at the lower limit zoom ratio or higher.

When many unspecified users access the camera 110 while access restriction information is set for a predetermined view-restricted area, an access permission information table representing the presence/absence of access permission for each user is generated in the connected user management database 116. The access permission information is set for each view-restricted area and each user based on information stored in the area management database 115.

Figure 16:
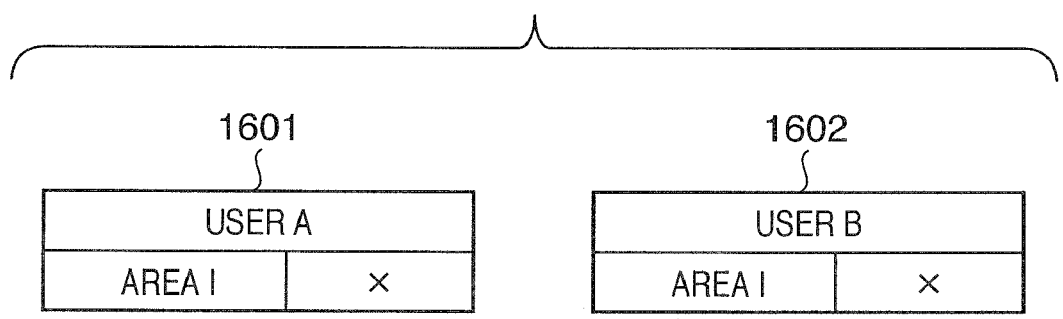
FIG. 16 is a view illustrating a table generated when a user accesses a camera.

FIG. 16 illustrates tables 401 and 402 generated when users A and B access the camera 110. The tables 401 and 402 shown in FIG. 16 store information (X) representing that neither user A nor B is permitted to access area I. When a plurality of view-restricted areas exist, access permission information is stored for each area, and the contents of each table dynamically change in accordance with various kinds of access restriction information.

Figure 17:
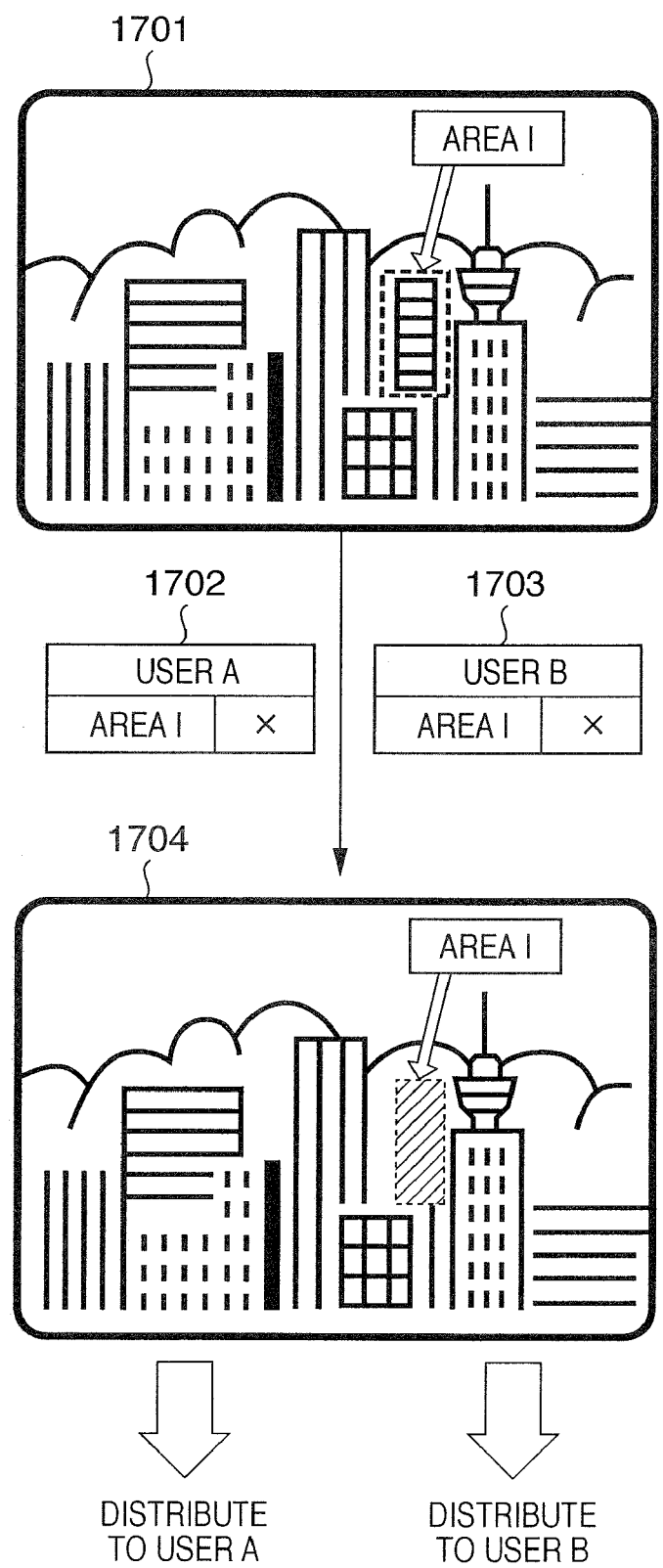
FIG. 17 is a view for explaining an image process and distribution process based on access permission information.

An image process by the image processing unit 118 will be described with reference to FIG. 17.

Based on pieces of information stored in the two databases 115 and 116 of the restricted area management unit 114, the image processing unit 118 generates video of a predetermined pattern by performing a predetermined image process for original video output from the image sensing unit 111. For example, when area I exists in the shootable range of the camera 110 as represented by a camera shootable range 1701, video images of predetermined patterns are generated in accordance with pieces of access permission information 1702 and 1703 of users A and B who access the camera 110. Since users A and B have the same access permission information and neither of them is permitted to access area I, pattern 1 video 1704 in which area I is blackened is generated.

The pattern 1 video 1704 generated by the image processing unit 118 is sent to a distribution unit 117, which distributes the pattern 1 video 1704 to users A and B.

Figure 18:
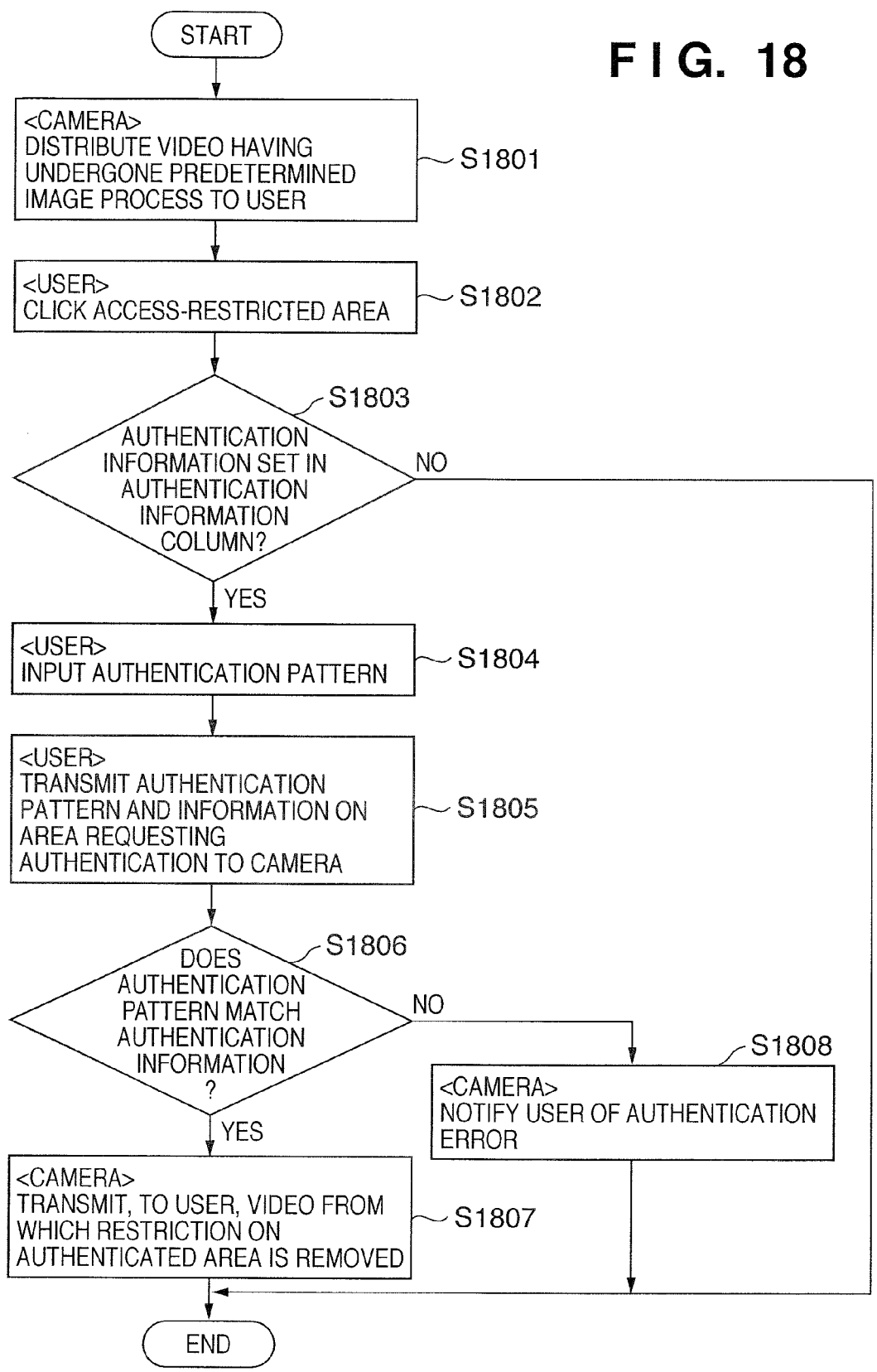
FIG. 18 is a flowchart showing procedures to perform access authentication for video containing a view-restricted area and distribute video from which a restriction on the area is removed.
Figure 19:
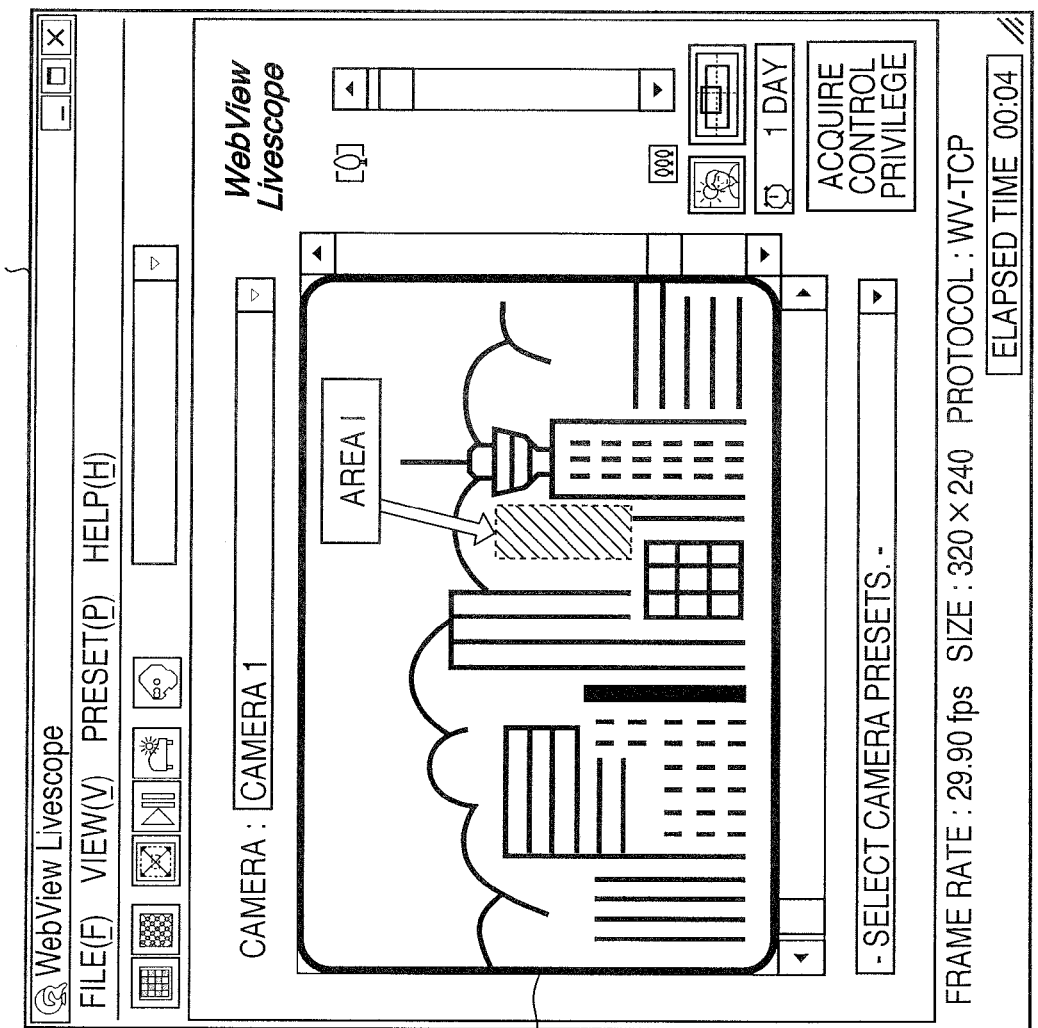
FIG. 19 is a view illustrating a display window on the viewer when a user monitors video containing a view-restricted area.

Procedures to distribute video from which various view restrictions on a view-restricted area are removed when a user who monitors the video of the view-restricted area performs access authentication for the view-restricted area will be explained with reference to the flowchart of FIG. 18. FIG. 19 illustrates a display window on the viewer when user A monitors video containing area I having access restriction information shown in FIG. 15.

Figure 20:
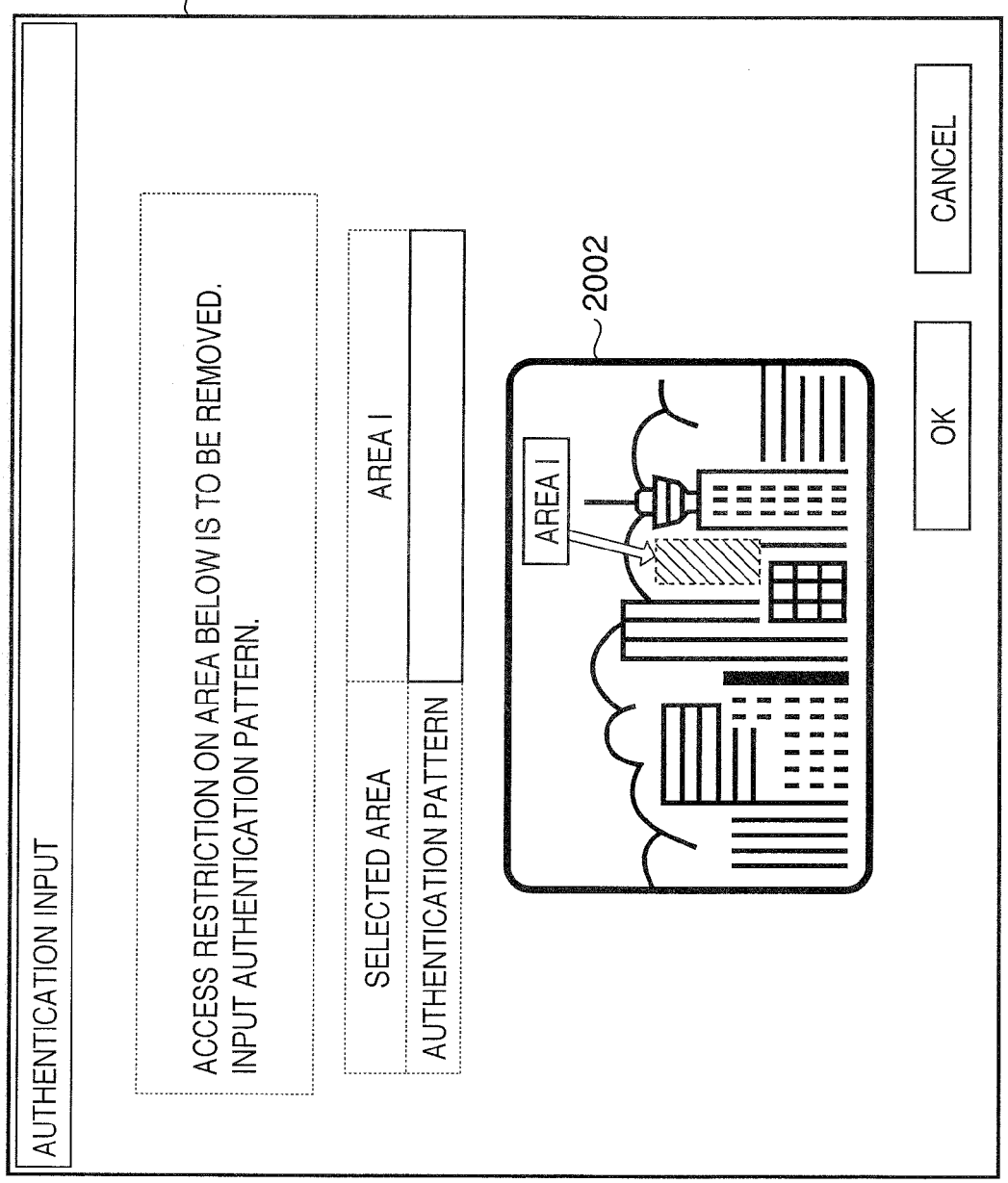
FIG. 20 is a view illustrating an authentication input window.

A shot image display area 1902 in a viewer 1901 displays video which is generated by the image processing unit 118 of the camera 110 and contains blackened area I (S1801). If user A clicks area I (S1802), an authentication input window 2001 as shown in FIG. 20 appears to allow user A to input an authentication pattern (S1804). The authentication input window 2001 shows an image explicitly indicating an area from which the access restriction is to be removed.

Figure 24:
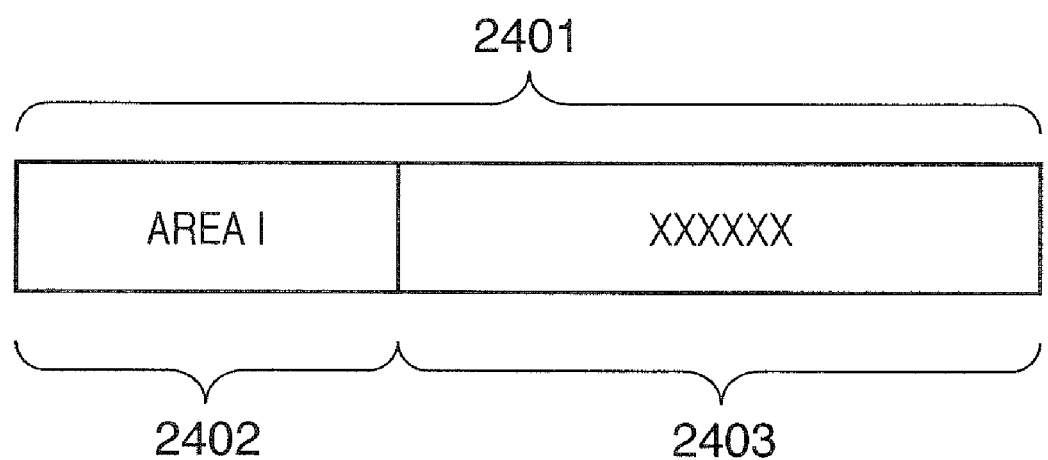
FIG. 24 is a view showing the structure of a data packet transmitted to a camera.

The authentication pattern input to the authentication input window 2001 is transmitted to the camera 110 via the communication unit 121 (S1805). FIG. 24 illustrates the structure of a data packet transmitted to the camera 110. A data packet 2401 contains an authentication area identification field 2402 and authentication pattern field 2403.

Figure 21:
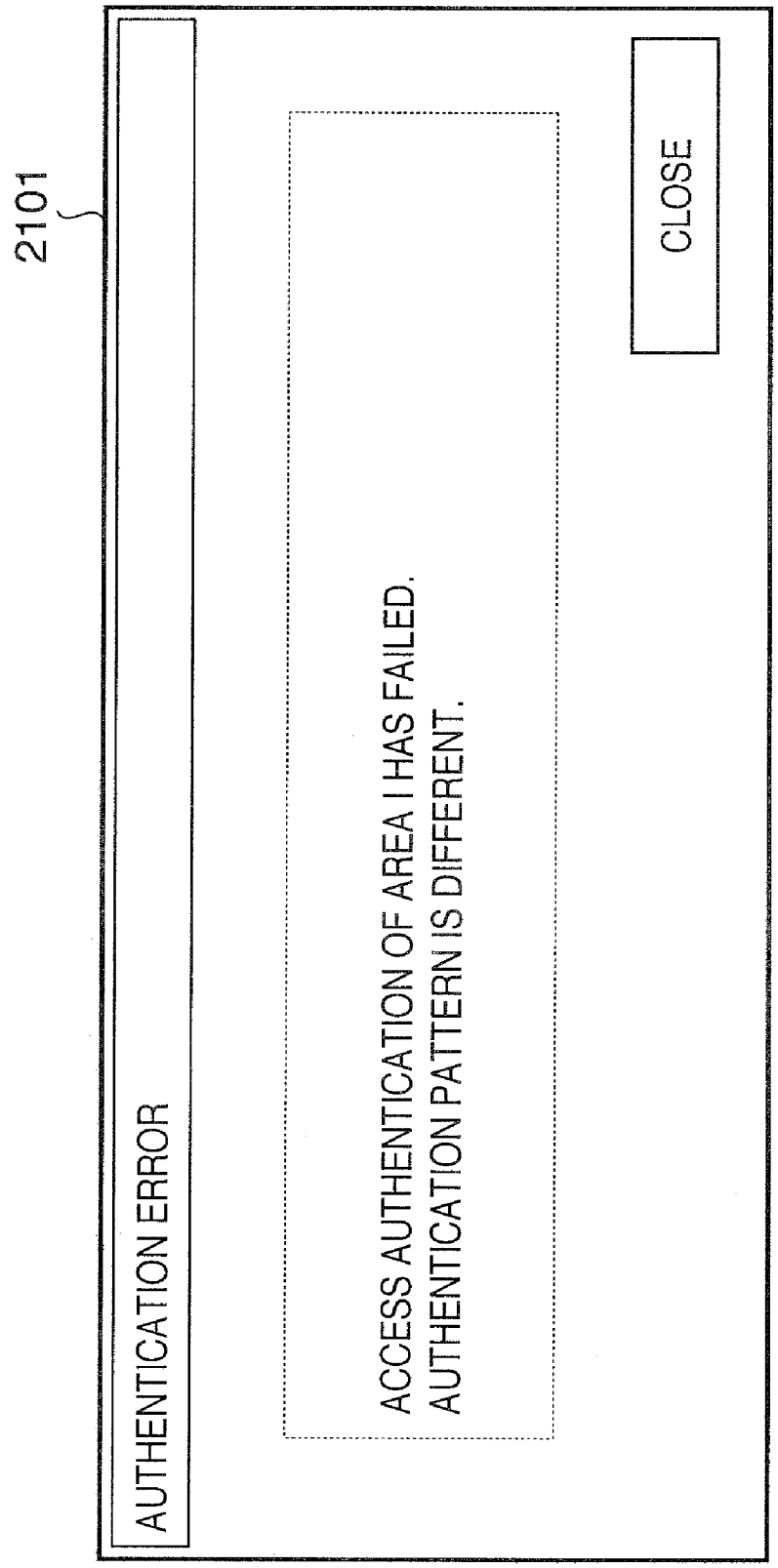
FIG. 21 is a view illustrating an authentication error notification window.
Figure 22:
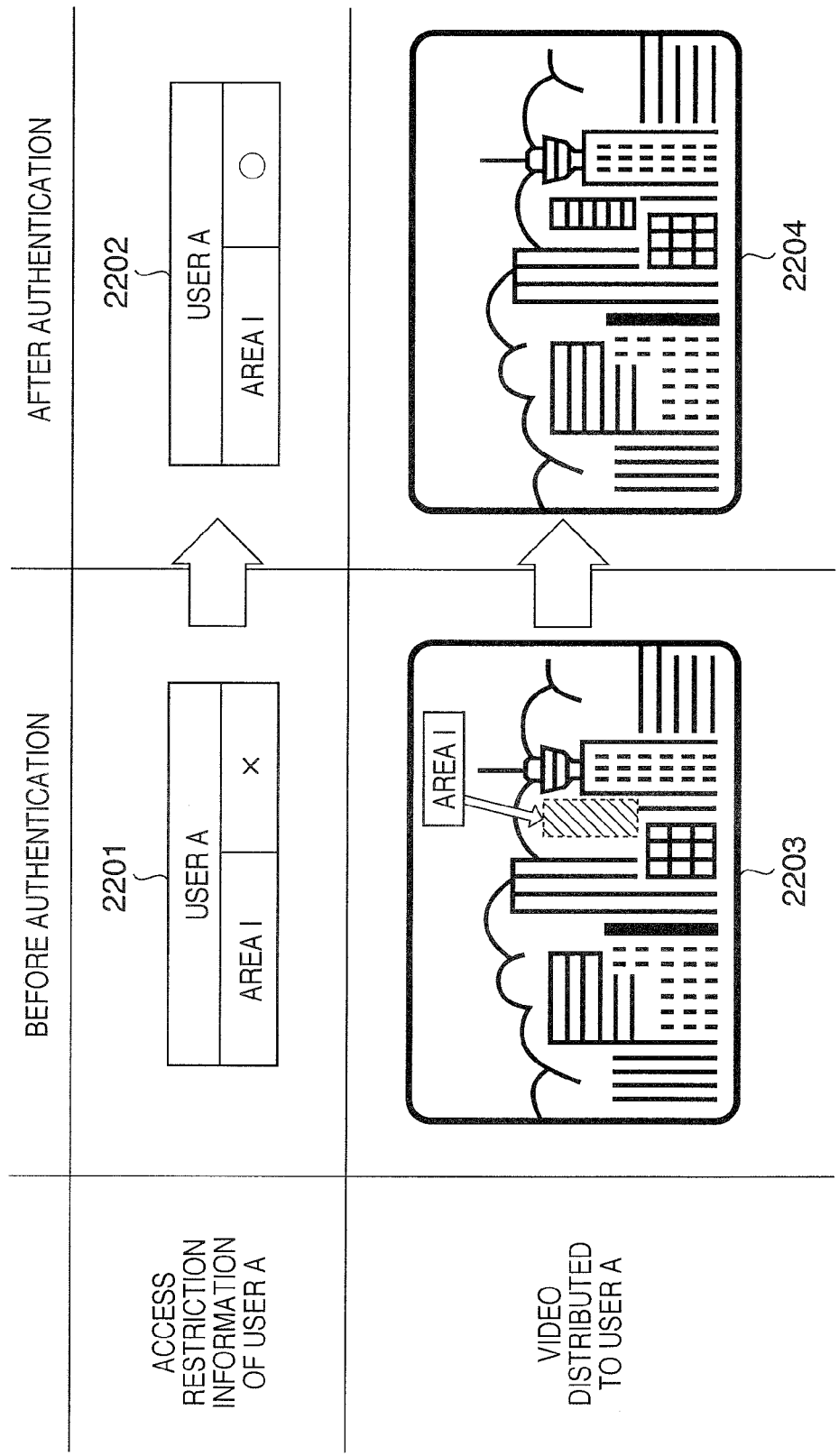
FIG. 22 is a view illustrating access permission information and distributed video before and after authentication.

The authentication unit 119 of the camera 110 compares the authentication pattern transmitted to the camera 110 with the authentication information 1515 stored in advance in the area management database 115 (S1806). If the authentication pattern is different from the authentication information 1515, an authentication error notification 2101 as shown in FIG. 21 is transmitted to user A (S1808). If the authentication pattern matches the authentication information 1515 (S1807), access permission information stored for each user in the connected user management database 116 is changed as shown in FIG. 22. More specifically, access permission of user A to area I changes from no access permission 2201 to access permission 2202. Then, the distribution unit 117 distributes, to user A, video 2204 from which the view restriction on area I is removed. At this time, the view restriction on area I is removed for only user A, and user B keeps receiving view-restricted video 2203.

When the user does not remove the access restriction on the basis of authentication information, i.e., the authentication information 1515 in the area management database 115 does not have any setting (NO in S1803), the authentication input window 2001 does not appear. That is, even if the user clicks the view-restricted area in the shot image display area 1902, the authentication input window 2001 does not appear, and the user cannot remove the access restriction by authentication.

In this manner, even when a user is not permitted in advance to access a view-restricted area, he can easily monitor video containing the area by inputting an authentication pattern.

The present invention is not limited to the above-described embodiments. For example, in the above-described embodiments, the authentication input window is displayed by clicking a view-restricted area. Alternatively, the authentication input window may also automatically appear if a view-restricted area exists in the shootable range of the camera 110.

Figure 23A:
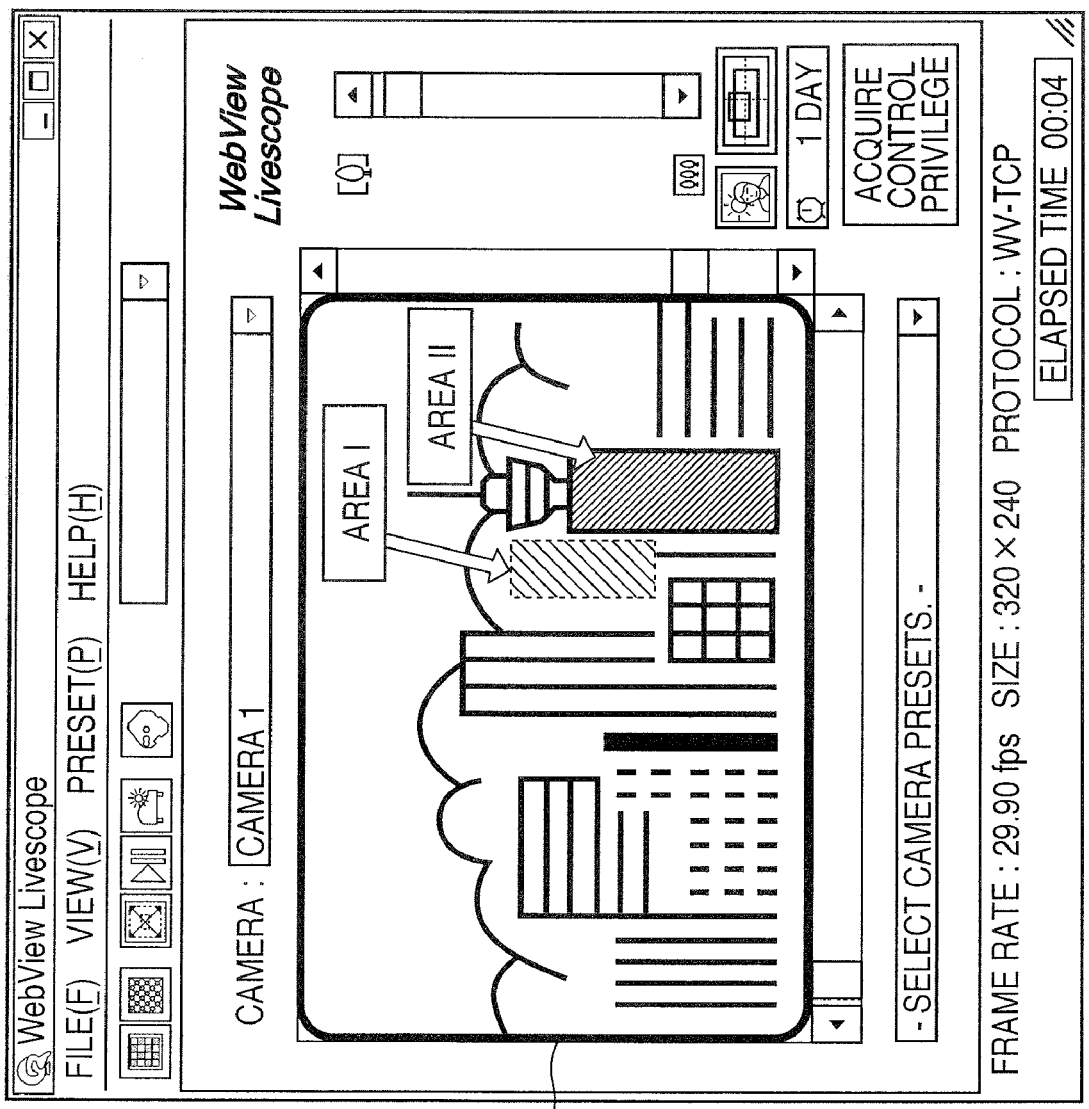

FIGS. 23A and 23B illustrate automatically and simultaneously displayed authentication input windows. When a plurality of view-restricted areas exist in a shootable range 2301, an authentication input window 2302 displays their identifiers in columns 2303 and 2304. It is also possible not only to perform authentication from shot video, but also to remove the access restriction on each view-restricted area from video obtained by panoramically shooting the entire shootable range of the camera 110.

Other Embodiments

The present invention is also achieved by supplying a computer program for implementing the functions of the above-described embodiments to a system or apparatus directly or from a remote place. In this case, the computer of the system or the like reads out and executes the computer program.

The present invention is therefore implemented by the computer program installed in the computer in order to implement functional processes of the present invention by the computer.

In this case, the present invention may take the form of an object code, a program executed by an interpreter, or script data supplied to an OS as long as a program function is attained.

Examples of a recording medium (storage medium) for supplying the program are a flexible disk, hard disk, optical disk, and magnetooptical disk. Other examples are an MO, CD-ROM, CD-R, CD-RW, magnetic tape, nonvolatile memory card, ROM, and DVD (DVD-ROM and DVD-R).

As another program supply method, the computer program of the present invention can be downloaded by connecting a client computer to an Internet homepage via the browser of the client computer, or downloading a compressed file containing an automatic installing function to a recording medium such as a hard disk. The computer program can also be implemented by dividing the computer program which forms the program of the present invention into a plurality of files, and downloading the files from different homepages. That is, the present invention also incorporates a WWW server which allows a plurality of users to download the program files for implementing functional processes of the present invention by a computer.

The program of the present invention can be encrypted, stored in a storage medium such as a CD-ROM, and distributed to a user. A user who satisfies predetermined conditions can download decryption key information from a homepage via the Internet. The user executes the encrypted program using the downloaded key information, and installs the program in the computer.

The functions of the above-described embodiments are implemented when the computer executes the readout program. Also, the functions of the above-described embodiments are implemented when an OS or the like running on the computer performs some or all of actual processes based on the instructions of the program.

The functions of the above-described embodiments are also implemented when the program read out from the recording medium is written in the memory of a function expansion board inserted into the computer or the memory of a function expansion unit connected to the computer, and the CPU of the board or the like performs some or all of actual processes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-240791, filed Sep. 5, 2006, which is hereby incorporated by reference herein in its entirety.

What is claimed is:

1. A shooting system which connects an image sensing apparatus to a monitoring apparatus capable of displaying an image shot by the image sensing apparatus, and which distributes an image from the image sensing apparatus to the monitoring apparatus, the system comprising:
    an administrator setting unit configured to set a first administrator to administrate whether an apparatus is permitted to display a first partial area contained in a shootable range of the image sensing apparatus, and to set a second administrator to administrate whether an apparatus is permitted to display a second partial area contained in the shootable range of the image sensing apparatus;
    an image processing unit configured to perform a process to restrict display of a partial area; and
    an image distribution unit configured to distribute, to a monitoring apparatus, an image of the first partial area which has not been processed by the image processing unit to restrict display and an image of the second partial area which has been processed by the image processing unit to restrict display, in a case where the monitoring apparatus is permitted by the first administrator to display the first partial area and is not permitted by the second administrator to display the second partial area.

2. The system according to claim 1, further comprising a data storage unit configured to store restriction information containing at least user information for identification of the monitoring apparatus which is permitted to display a partial area.

3. The system according to claim 2, wherein the data storage unit stores range information of the partial area, identification information representing the partial area, the information on the administrator, and information on a shooting condition and restriction content to restrict display.

4. The system according to claim 2, wherein the data storage unit further comprises a unit configured to update the restriction information.

5. The system according to claim 1, wherein the image sensing apparatus comprises the administrator setting unit, and
wherein the image distribution unit distributes the image based on restriction information from the monitoring apparatus which is set as the administrator.

6. The system according to claim 5, wherein the monitoring apparatus comprises a display unit configured to display a setup window configured to set the restriction information.

7. The system according to claim 1, wherein the administrator setting unit can set plurality of administrators for one display-restricted partial area.

8. The system according to claim 1, wherein the image sensing apparatus transmits, to the monitoring apparatus, a message that the monitoring apparatus is set as the administrator.

9. The system according to claim 1, wherein the monitoring apparatus further comprises a restriction removal unit configured to remove a restriction from the partial area.

10. The system according to claim 9, wherein said restriction removal unit comprises (a) a unit configured to designate the display-restricted partial area from which the restriction is to be removed, (b) a unit configured to input an authentication pattern, and (c) a unit configured to transmit the input authentication pattern to the image sensing apparatus, and
wherein the image sensing apparatus further comprises (a) a unit configured to collate the authentication pattern with preset authentication information, and (b) a unit configured to, when the authentication pattern matches the authentication information, distribute, to the monitoring apparatus, an image from which the restriction is removed, and when the authentication pattern does not match the authentication information, notify the monitoring apparatus of an authentication failure.

11. The system according to claim 10, wherein when the restriction is removed, the data storage unit changes the restriction information to access permission information.

12. The system according to claim 9, wherein when a plurality of display-restricted partial areas exist, the monitoring apparatus can remove the restriction from each partial area.

13. An access control apparatus which controls distribution of an image from an image sensing apparatus to a monitoring apparatus, comprising:
an administrator setting unit configured to set a first administrator to administrate whether a monitoring apparatus is permitted to display a first partial area contained in a shootable range of the image sensing apparatus, and to set a second administrator to administrate a monitoring apparatus is permitted to display a second partial area contained in the shootable range of the image sensing apparatus; and
a control unit configured to control distribution, to a monitoring apparatus of, an image of the first partial area which has not been processed to restrict display and an image of the second partial area which has been processed to restrict display, in a case where the monitoring apparatus is permitted by the first administrator to display the first partial area and is not permitted by the second administrator to display the second partial area.

14. A monitoring apparatus which displays an image distributed from an image sensing apparatus, comprising:
a restriction setting unit configured to set another monitoring apparatus to be permitted to display a first partial area on which the monitoring apparatus is set as an administrator that is permitted to set the another monitoring apparatus, among partial areas contained in a shootable range of the image sensing apparatus, the partial areas comprising the first partial area and a second partial area; and
a transmission unit configured to transmit restriction information based on the setting by the restriction setting unit to the image sensing apparatus,
wherein the monitoring apparatus is set to be permitted to display the second partial area on which another monitoring apparatus is set as an administrator that is permitted to set the monitoring apparatus.

15. A method of controlling a shooting system which connects an image sensing apparatus to a monitoring apparatus capable of displaying an image shot by the image sensing apparatus, and which distributes an image from the image sensing apparatus to the monitoring apparatus, the method comprising the steps of:
setting a first administrator to administrate whether a monitoring apparatus is permitted to display a first partial area contained in a shootable range of the image sensing apparatus, and a second administrator to administrate whether a monitoring apparatus is permitted to display a second partial area contained in the shootable range of the image sensing apparatus;
performing an image processing to restrict display of a partial area; and
distributing, to a monitoring apparatus, an image of the first partial area which has not been processed in the performing step to restrict display and an image of the second partial area which has been processed in the performing step to restrict display, in a case where the monitoring apparatus is permitted by the first administrator to display the first partial area and is not permitted by the second administrator to display the second partial area.

16. A method of controlling a control apparatus which distributes an image to the monitoring apparatus, the method comprising the steps of:
setting a first administrator to administrate whether a monitoring apparatus is permitted to display a first partial area contained in a shootable range of an image sensing apparatus, and a second administrator to administrate whether a monitoring apparatus is permitted to display a second partial area contained in the shootable range of the image sensing apparatus; and
controlling to distribute, to a monitoring apparatus, an image of the first partial area which has not been processed to restrict display and an image of the second partial area has been processed to restrict display, in a case where the monitoring apparatus is permitted by the first administrator to display the first partial area and is not permitted by the second administrator to display the second partial area.

17. A method of controlling a monitoring apparatus which displays an image distributed from an image sensing apparatus, the method comprising the steps of:
setting another monitoring apparatus to be permitted to display a first partial area on which the monitoring apparatus is set as an administrator that is permitted to set the another monitoring apparatus, among partial areas contained in a shootable range of the image sensing apparatus, the partial areas comprising the first partial area and a second partial area; and
transmitting the restriction information based on the setting in the setting step to the image sensing apparatus, wherein the monitoring apparatus is set to be permitted to display the second partial area on which another monitoring apparatus is set as an administrator that is permitted to set the monitoring apparatus.

18. A non-transitory computer-readable storage medium which effects a method as recited in claim 15.

19. A non-transitory computer-readable storage medium which stores a program for causing a computer to control distribution of an image from an image sensing apparatus which to a monitoring apparatus, the computer executing a method comprising the steps of:

setting a first administrator to administrate whether a monitoring apparatus is permitted to display a first partial area contained in a shootable range of the image sensing apparatus, and a second administrator to administrate whether a monitoring apparatus is permitted to display a second partial area contained in the shootable range of the image sensing apparatus; and controlling to distribute, to a monitoring apparatus, an image of the first partial area which has not been processed to restrict display and an image of the second partial area which has been processed to restrict display, in a case where the monitoring apparatus is permitted by the first administrator to display the first partial area and is not permitted by the second administrator to display the second partial area.

20. A non-transitory computer-readable storage medium which stores a program for causing a computer to display an image distributed from an image sensing apparatus, the computer executing a method comprising the steps of:

setting another monitoring apparatus to be permitted to display a first partial area on which the computer is set as an administrator that is permitted to set the another monitoring apparatus, among partial areas contained in a shootable range of the image sensing apparatus, the partial areas comprising the first partial area and a second partial area; and transmitting restriction information based on the setting in the setting step to the image sensing apparatus, wherein the computer is set to be permitted to display the second partial area on which another monitoring apparatus is set as an administrator that is permitted to set the computer.

* * * * *